United States Patent
Fix et al.

(10) Patent No.: US 9,769,615 B2
(45) Date of Patent: *Sep. 19, 2017

(54) GEOGRAPHIC REDUNDANCY DETERMINATION FOR TIME BASED LOCATION INFORMATION IN A WIRELESS RADIO NETWORK

(71) Applicants: AT&T Mobility II LLC, Atlanta, GA (US); AT&T INTELLECTUAL PROPERTY I, L.P., Atlanta, GA (US)

(72) Inventors: Jeremy Fix, Acworth, GA (US); Jie Chen, Watchung, NJ (US); Sheldon Kent Meredith, Marietta, GA (US)

(73) Assignees: AT&T INTELLECTUAL PROPERTY I, L.P., Atlanta, GA (US); AT&T MOBILITY II LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/466,853

(22) Filed: Mar. 22, 2017

(65) Prior Publication Data

US 2017/0195844 A1 Jul. 6, 2017

Related U.S. Application Data

(63) Continuation of application No. 15/186,410, filed on Jun. 17, 2016, now Pat. No. 9,615,349, which is a (Continued)

(51) Int. Cl.
*H04W 64/00* (2009.01)
*G01S 5/02* (2010.01)
(Continued)

(52) U.S. Cl.
CPC .......... *H04W 4/023* (2013.01); *G01S 5/0226* (2013.01); *H04W 56/005* (2013.01)

(58) Field of Classification Search
CPC .... H04W 4/023; H04W 56/005; G01S 5/0226
(Continued)

(56) References Cited

U.S. PATENT DOCUMENTS

| 4,718,081 A | 1/1988 | Brenig |
| 5,515,062 A | 5/1996 | Maine et al. |

(Continued)

FOREIGN PATENT DOCUMENTS

| EP | 0856746 A2 | 8/1998 |
| EP | 1145526 | 10/2001 |

(Continued)

OTHER PUBLICATIONS

Notice of Allowance dated Aug. 21, 2014 for U.S. Appl. No. 13/447,069, 78 pages.

(Continued)

*Primary Examiner* — Sharad Rampuria
(74) *Attorney, Agent, or Firm* — Amin, Turocy & Watson, LLP

(57) ABSTRACT

Determining levels of geographic redundancy among radios of a wireless radio network is disclosed. The level of geographic redundancy for a radio can affect the determination of location information for a user equipment (UE) on the wireless radio network. The disclosed subject matter can be employed in conjunction with timed fingerprint location (TFL) technologies to facilitate selection of radios employed in determining time values for TFL location determination. Levels of geographic redundancy can be employed to rank or order radios of a wireless radio network so as to reduce the likelihood of using geographically redundant radios in location determination. Further, rules can be selected to adjust threshold values and equations employed in determining the levels of geographic redundancy. Moreover, rules can be selected to apply boundary conditions to reduce (Continued)

the number of determinations formed for a set of radios of the wireless radio network.

20 Claims, 10 Drawing Sheets

Related U.S. Application Data continuation of application No. 14/520,287, filed on Oct. 21, 2014, now Pat. No. 9,398,556, which is a continuation of application No. 13/525,065, filed on Jun. 15, 2012, now Pat. No. 8,897,805.

(51) Int. Cl.
  *H04W 4/02* (2009.01)
  *H04W 56/00* (2009.01)

(58) Field of Classification Search
  USPC .............................. 455/456.1–457, 423–425
  See application file for complete search history.

(56) References Cited

U.S. PATENT DOCUMENTS

| | | |
|---|---|---|
| 5,724,660 A | 3/1998 | Kauser et al. |
| 5,732,354 A | 3/1998 | MacDonald |
| 5,732,383 A | 3/1998 | Foladare et al. |
| 5,831,545 A | 11/1998 | Murray et al. |
| 5,844,521 A | 12/1998 | Stephens et al. |
| 5,982,324 A | 11/1999 | Watters et al. |
| 6,018,312 A | 1/2000 | Haworth |
| 6,026,301 A | 2/2000 | Satarasinghe |
| 6,058,260 A | 5/2000 | Brockel et al. |
| 6,108,532 A | 8/2000 | Matsuda et al. |
| 6,108,556 A | 8/2000 | Ito |
| 6,125,125 A | 9/2000 | Narasimha et al. |
| 6,148,219 A | 11/2000 | Engelbrecht et al. |
| 6,216,002 B1 | 4/2001 | Holmring |
| 6,230,018 B1 | 5/2001 | Watters et al. |
| 6,256,577 B1 | 7/2001 | Graunke |
| 6,263,190 B1 | 7/2001 | Mamori et al. |
| 6,292,665 B1 | 9/2001 | Hildebrand et al. |
| 6,298,233 B1 | 10/2001 | Souissi et al. |
| 6,307,503 B1 | 10/2001 | Liu et al. |
| 6,311,078 B1 | 10/2001 | Hardouin |
| 6,317,686 B1 | 11/2001 | Ran |
| 6,321,092 B1 | 11/2001 | Fitch et al. |
| 6,330,459 B1 | 12/2001 | Crichton et al. |
| 6,351,235 B1 | 2/2002 | Stilp |
| 6,353,778 B1 | 3/2002 | Brown |
| 6,397,074 B1 | 5/2002 | Pihl et al. |
| 6,405,047 B1 | 6/2002 | Moon |
| 6,407,703 B1 | 6/2002 | Minter et al. |
| 6,429,815 B1 | 8/2002 | Soliman |
| 6,434,396 B1 | 8/2002 | Rune |
| 6,449,486 B1 | 9/2002 | Rao |
| 6,453,168 B1 | 9/2002 | McCrady et al. |
| 6,493,539 B1 | 12/2002 | Falco et al. |
| 6,515,623 B2 | 2/2003 | Johnson |
| 6,522,296 B2 | 2/2003 | Holt |
| 6,526,335 B1 | 2/2003 | Treyz et al. |
| 6,552,682 B1 | 4/2003 | Fan |
| 6,560,532 B2 | 5/2003 | Cayford |
| 6,560,567 B1 | 5/2003 | Yechuri et al. |
| 6,594,576 B2 | 7/2003 | Fan et al. |
| 6,604,083 B1 | 8/2003 | Bailey et al. |
| 6,668,226 B2 | 12/2003 | Sutanto et al. |
| 6,690,292 B1 | 2/2004 | Meadows et al. |
| 6,744,383 B1 | 6/2004 | Alfred et al. |
| 6,744,740 B2 | 6/2004 | Chen |
| 6,757,545 B2 | 6/2004 | Nowak et al. |
| 6,801,782 B2 | 10/2004 | McCrady et al. |
| 6,801,855 B1 | 10/2004 | Walters et al. |
| 6,816,782 B1 | 11/2004 | Walters et al. |
| 6,850,761 B2 | 2/2005 | Pallonen |
| 6,892,054 B2 | 5/2005 | Belcher et al. |
| 6,915,123 B1 | 7/2005 | Daudelin et al. |
| 6,933,100 B2 | 8/2005 | Igawa et al. |
| 6,933,860 B1 | 8/2005 | Gehman et al. |
| 7,058,710 B2 | 6/2006 | McCall et al. |
| 7,065,349 B2 | 6/2006 | Nath et al. |
| 7,113,793 B2 | 9/2006 | Veerasamy et al. |
| 7,149,534 B2 | 12/2006 | Bloebaum et al. |
| 7,181,218 B2 | 2/2007 | Ovesjo et al. |
| 7,203,752 B2 | 4/2007 | Rice et al. |
| 7,277,049 B2 | 10/2007 | Korneluk et al. |
| 7,289,039 B2 | 10/2007 | Kato et al. |
| 7,346,359 B2 * | 3/2008 | Damarla ............... G01S 5/0252 455/404.2 |
| 7,359,719 B1 | 4/2008 | Duffett-Smith et al. |
| 7,366,492 B1 | 4/2008 | Ganesh |
| 7,375,649 B2 | 5/2008 | Gueziec |
| 7,420,464 B2 | 9/2008 | Fitzgerald et al. |
| 7,432,829 B2 | 10/2008 | Poltorak |
| 7,436,794 B2 | 10/2008 | Takahashi et al. |
| 7,463,143 B2 | 12/2008 | Forr et al. |
| 7,508,321 B2 | 3/2009 | Gueziec |
| 7,664,492 B1 | 2/2010 | Lee et al. |
| 7,696,922 B2 | 4/2010 | Nicholson et al. |
| 7,697,917 B2 | 4/2010 | Camp et al. |
| 7,706,964 B2 | 4/2010 | Horvitz et al. |
| 7,744,740 B2 | 6/2010 | Diehl |
| 7,747,258 B2 | 6/2010 | Farmer et al. |
| 7,761,225 B2 | 7/2010 | Vaughn |
| 7,831,380 B2 | 11/2010 | Chapman et al. |
| 7,848,880 B2 | 12/2010 | Cheung |
| 7,890,299 B2 | 2/2011 | Fok et al. |
| 7,917,156 B2 | 3/2011 | Sheynblat et al. |
| 7,945,271 B1 | 5/2011 | Barnes et al. |
| 7,958,001 B2 | 6/2011 | Abbadessa et al. |
| 7,962,162 B2 | 6/2011 | McNair |
| 7,962,280 B2 | 6/2011 | Kindo et al. |
| 7,994,981 B1 | 8/2011 | Farrokhi et al. |
| 7,996,020 B1 | 8/2011 | Chhabra |
| 8,000,726 B2 | 8/2011 | Altman et al. |
| 8,005,050 B2 | 8/2011 | Scheinert et al. |
| 8,010,164 B1 | 8/2011 | Sennett et al. |
| 8,036,822 B2 | 10/2011 | Ho et al. |
| 8,050,690 B2 | 11/2011 | Neeraj |
| 8,054,802 B2 | 11/2011 | Burgess et al. |
| 8,065,185 B2 | 11/2011 | Foladare et al. |
| 8,098,152 B2 | 1/2012 | Zhang et al. |
| 8,121,604 B1 | 2/2012 | Schwinghammer |
| 8,126,479 B2 | 2/2012 | Morrison |
| 8,140,079 B2 * | 3/2012 | Olson ................... H04W 36/32 455/436 |
| 8,193,984 B2 | 6/2012 | Ward et al. |
| 8,194,589 B2 | 6/2012 | Wynn et al. |
| 8,195,175 B2 | 6/2012 | Govindan et al. |
| 8,224,349 B2 | 7/2012 | Meredith et al. |
| 8,253,559 B2 | 8/2012 | Howard et al. |
| 8,254,959 B2 | 8/2012 | Fix et al. |
| 8,264,956 B2 | 9/2012 | Ramankutty et al. |
| 8,270,933 B2 | 9/2012 | Riemer et al. |
| 8,280,438 B2 | 10/2012 | Barbera et al. |
| 8,295,854 B2 | 10/2012 | Osann et al. |
| 8,300,663 B2 | 10/2012 | Chion et al. |
| 8,307,030 B1 | 11/2012 | Hu |
| 8,326,682 B2 | 12/2012 | Redford et al. |
| 8,355,364 B1 | 1/2013 | Vargantwar et al. |
| 8,355,865 B2 | 1/2013 | Wagner et al. |
| 8,417,264 B1 | 4/2013 | Whitney et al. |
| 8,469,274 B2 | 6/2013 | Tseng et al. |
| 8,548,494 B2 | 10/2013 | Agarwal et al. |
| 8,572,198 B2 | 10/2013 | Jhanji |
| 8,594,700 B2 | 11/2013 | Nabbefeld |
| 8,611,919 B2 | 12/2013 | Barnes |
| 8,612,410 B2 | 12/2013 | Meredith et al. |
| 8,666,388 B2 | 3/2014 | Catovic et al. |
| 8,666,390 B2 | 3/2014 | Meredith et al. |
| 8,761,799 B2 | 6/2014 | Meredith et al. |
| 8,897,805 B2 | 11/2014 | Fix et al. |
| 8,909,247 B2 | 12/2014 | Tipton et al. |

(56) References Cited

U.S. PATENT DOCUMENTS

| | | |
|---|---|---|
| 8,923,134 B2 | 12/2014 | Meredith et al. |
| 8,929,827 B2 * | 1/2015 | Fix ..................... H04W 24/02 370/252 |
| 9,008,684 B2 | 4/2015 | Tipton et al. |
| 9,008,698 B2 | 4/2015 | Meredith et al. |
| 9,232,399 B2 | 1/2016 | Tipton et al. |
| 2001/0047242 A1 | 11/2001 | Ohta |
| 2002/0059266 A1 | 5/2002 | I'anson et al. |
| 2002/0069312 A1 | 6/2002 | Jones |
| 2002/0077116 A1 | 6/2002 | Havinis et al. |
| 2002/0172223 A1 | 11/2002 | Stilp et al. |
| 2003/0040323 A1 | 2/2003 | Pihl et al. |
| 2003/0092448 A1 | 5/2003 | Forstrom et al. |
| 2003/0095065 A1 | 5/2003 | Ericson et al. |
| 2003/0097330 A1 | 5/2003 | Hillmer et al. |
| 2003/0115228 A1 | 6/2003 | Horvitz et al. |
| 2003/0115260 A1 | 6/2003 | Edge |
| 2003/0125046 A1 | 7/2003 | Riley et al. |
| 2003/0158924 A1 | 8/2003 | DeLegge |
| 2003/0222819 A1 | 12/2003 | Karr et al. |
| 2003/0225508 A9 | 12/2003 | Petzold et al. |
| 2004/0023664 A1 | 2/2004 | Mirouze et al. |
| 2004/0024639 A1 | 2/2004 | Goldman et al. |
| 2004/0067759 A1 | 4/2004 | Spirito et al. |
| 2004/0082338 A1 | 4/2004 | Norrgard et al. |
| 2004/0127191 A1 | 7/2004 | Matsunaga |
| 2004/0131036 A1 | 7/2004 | Walsh |
| 2004/0155814 A1 | 8/2004 | Bascobert |
| 2004/0172190 A1 | 9/2004 | Tsunehara et al. |
| 2004/0219930 A1 | 11/2004 | Lin |
| 2004/0224698 A1 | 11/2004 | Yi et al. |
| 2004/0267410 A1 | 12/2004 | Duri et al. |
| 2004/0267561 A1 | 12/2004 | Meshkin et al. |
| 2005/0007993 A1 | 1/2005 | Chambers et al. |
| 2005/0039056 A1 | 2/2005 | Bagga et al. |
| 2005/0053099 A1 | 3/2005 | Spear et al. |
| 2005/0136911 A1 | 6/2005 | Csapo et al. |
| 2005/0239410 A1 | 10/2005 | Rochester |
| 2005/0272445 A1 | 12/2005 | Zellner |
| 2005/0276385 A1 | 12/2005 | McCormick et al. |
| 2006/0030333 A1 | 2/2006 | Ward et al. |
| 2006/0046744 A1 | 3/2006 | Dublish et al. |
| 2006/0075131 A1 | 4/2006 | Douglas et al. |
| 2006/0089153 A1 | 4/2006 | Sheynblat |
| 2006/0200303 A1 | 9/2006 | Fuentes et al. |
| 2006/0233133 A1 | 10/2006 | Liu et al. |
| 2006/0240839 A1 | 10/2006 | Chen et al. |
| 2006/0240841 A1 | 10/2006 | Bhattacharya |
| 2006/0246918 A1 | 11/2006 | Fok et al. |
| 2006/0267841 A1 | 11/2006 | Lee et al. |
| 2006/0270419 A1 | 11/2006 | Crowley et al. |
| 2006/0282660 A1 | 12/2006 | Varghese et al. |
| 2007/0001873 A1 | 1/2007 | Ishikawa et al. |
| 2007/0049286 A1 | 3/2007 | Kim et al. |
| 2007/0060130 A1 | 3/2007 | Gogic et al. |
| 2007/0088818 A1 | 4/2007 | Roberts et al. |
| 2007/0121560 A1 | 5/2007 | Edge |
| 2007/0149214 A1 | 6/2007 | Walsh et al. |
| 2007/0176749 A1 | 8/2007 | Boyd |
| 2007/0213074 A1 | 9/2007 | Fitch et al. |
| 2007/0217375 A1 | 9/2007 | Zampiello et al. |
| 2007/0217379 A1 | 9/2007 | Fujiwara et al. |
| 2007/0293157 A1 | 12/2007 | Haartsen et al. |
| 2007/0298807 A1 | 12/2007 | Yarkosky |
| 2008/0004789 A1 | 1/2008 | Horvitz et al. |
| 2008/0010365 A1 | 1/2008 | Schneider |
| 2008/0032705 A1 | 2/2008 | Patel et al. |
| 2008/0039114 A1 | 2/2008 | Phatak et al. |
| 2008/0056193 A1 | 3/2008 | Bourlas et al. |
| 2008/0070593 A1 | 3/2008 | Altman et al. |
| 2008/0071466 A1 | 3/2008 | Downs et al. |
| 2008/0076450 A1 | 3/2008 | Nanda et al. |
| 2008/0096566 A1 | 4/2008 | Brunner et al. |
| 2008/0127354 A1 | 5/2008 | Carpenter et al. |
| 2008/0133730 A1 | 6/2008 | Park et al. |
| 2008/0186234 A1 | 8/2008 | Alles et al. |
| 2008/0192682 A1 | 8/2008 | Matsumoto et al. |
| 2008/0274750 A1 | 11/2008 | Carlson et al. |
| 2008/0299995 A1 | 12/2008 | Spain |
| 2008/0305832 A1 | 12/2008 | Greenberg |
| 2008/0311923 A1 | 12/2008 | Petrovic et al. |
| 2009/0005064 A1 | 1/2009 | Malik et al. |
| 2009/0017823 A1 | 1/2009 | Sachs et al. |
| 2009/0024546 A1 | 1/2009 | Ficcaglia et al. |
| 2009/0028082 A1 | 1/2009 | Wynn et al. |
| 2009/0052330 A1 | 2/2009 | Matsunaga et al. |
| 2009/0079622 A1 | 3/2009 | Seshadri et al. |
| 2009/0104917 A1 | 4/2009 | Rached et al. |
| 2009/0117907 A1 | 5/2009 | Wigren et al. |
| 2009/0125380 A1 | 5/2009 | Otto et al. |
| 2009/0131073 A1 | 5/2009 | Carlson et al. |
| 2009/0177382 A1 | 7/2009 | Alles et al. |
| 2009/0181695 A1 | 7/2009 | Wirola et al. |
| 2009/0227265 A1 | 9/2009 | Kang et al. |
| 2009/0234876 A1 | 9/2009 | Schigel et al. |
| 2009/0260055 A1 | 10/2009 | Parmar |
| 2009/0280828 A1 | 11/2009 | Wang et al. |
| 2009/0286510 A1 | 11/2009 | Huber et al. |
| 2009/0287922 A1 | 11/2009 | Herwono et al. |
| 2009/0299788 A1 | 12/2009 | Huber et al. |
| 2009/0310501 A1 | 12/2009 | Catovic et al. |
| 2009/0312005 A1 | 12/2009 | Mukundan et al. |
| 2009/0327134 A1 | 12/2009 | Carlson et al. |
| 2010/0004997 A1 | 1/2010 | Mehta et al. |
| 2010/0020776 A1 | 1/2010 | Youssef et al. |
| 2010/0054237 A1 | 3/2010 | Han et al. |
| 2010/0056179 A1 | 3/2010 | Gaenger et al. |
| 2010/0058442 A1 | 3/2010 | Costa et al. |
| 2010/0081389 A1 | 4/2010 | Lawrow et al. |
| 2010/0094758 A1 | 4/2010 | Chamberlain et al. |
| 2010/0100732 A1 | 4/2010 | Hatakeyama et al. |
| 2010/0113035 A1 | 5/2010 | Eskicioglu et al. |
| 2010/0120447 A1 | 5/2010 | Anderson et al. |
| 2010/0122314 A1 | 5/2010 | Zhang et al. |
| 2010/0124886 A1 | 5/2010 | Fordham et al. |
| 2010/0124931 A1 | 5/2010 | Eskicioglu et al. |
| 2010/0135178 A1 | 6/2010 | Aggarwal et al. |
| 2010/0144368 A1 | 6/2010 | Sullivan |
| 2010/0159951 A1 | 6/2010 | Shkedi et al. |
| 2010/0163632 A1 | 7/2010 | Tseng et al. |
| 2010/0172259 A1 | 7/2010 | Aggarwal et al. |
| 2010/0180039 A1 | 7/2010 | Oh et al. |
| 2010/0189236 A1 | 7/2010 | MacDonald et al. |
| 2010/0190509 A1 | 7/2010 | Davis et al. |
| 2010/0195566 A1 | 8/2010 | Krishnamurthy et al. |
| 2010/0203903 A1 | 8/2010 | Dingler et al. |
| 2010/0207470 A1 | 8/2010 | Kim et al. |
| 2010/0220665 A1 | 9/2010 | Govindan et al. |
| 2010/0222075 A1 | 9/2010 | Miura |
| 2010/0227589 A1 | 9/2010 | Cook et al. |
| 2010/0250542 A1 | 9/2010 | Fujimaki |
| 2010/0262449 A1 | 10/2010 | Monteforte et al. |
| 2010/0273504 A1 | 10/2010 | Bull et al. |
| 2010/0291907 A1 | 11/2010 | MacNaughtan et al. |
| 2010/0296467 A1 | 11/2010 | Pelletier et al. |
| 2010/0299060 A1 | 11/2010 | Snavely et al. |
| 2010/0311437 A1 | 12/2010 | Palanki et al. |
| 2010/0313157 A1 | 12/2010 | Carlsson et al. |
| 2010/0323723 A1 | 12/2010 | Gerstenberger et al. |
| 2010/0331013 A1 | 12/2010 | Zhang |
| 2011/0009068 A1 | 1/2011 | Miura |
| 2011/0010085 A1 | 1/2011 | Tanaka et al. |
| 2011/0023129 A1 | 1/2011 | Vernal |
| 2011/0026475 A1 | 2/2011 | Lee et al. |
| 2011/0026495 A1 | 2/2011 | Lee et al. |
| 2011/0039593 A1 | 2/2011 | Lee et al. |
| 2011/0053609 A1 | 3/2011 | Grogan |
| 2011/0060808 A1 | 3/2011 | Martin et al. |
| 2011/0065450 A1 | 3/2011 | Kazmi |
| 2011/0069668 A1 | 3/2011 | Chion et al. |
| 2011/0072034 A1 | 3/2011 | Sly |
| 2011/0076975 A1 | 3/2011 | Kim et al. |
| 2011/0077030 A1 | 3/2011 | Wigren et al. |
| 2011/0077032 A1 | 3/2011 | Correale et al. |

(56) References Cited

U.S. PATENT DOCUMENTS

| | | |
|---|---|---|
| 2011/0099047 A1 | 4/2011 | Weiss et al. |
| 2011/0106416 A1 | 5/2011 | Scofield et al. |
| 2011/0130135 A1 | 6/2011 | Trigui |
| 2011/0151839 A1 | 6/2011 | Bolon et al. |
| 2011/0161261 A1 | 6/2011 | Wu et al. |
| 2011/0164596 A1 | 7/2011 | Montemurro et al. |
| 2011/0171912 A1 | 7/2011 | Beck et al. |
| 2011/0172905 A1 | 7/2011 | Schroder et al. |
| 2011/0205964 A1 | 8/2011 | Fix et al. |
| 2011/0207470 A1 | 8/2011 | Meredith et al. |
| 2011/0210843 A1 | 9/2011 | Kummetz et al. |
| 2011/0210849 A1 | 9/2011 | Howard et al. |
| 2011/0244879 A1 | 10/2011 | Siomina et al. |
| 2011/0256874 A1 | 10/2011 | Hayama et al. |
| 2011/0271331 A1 | 11/2011 | Adams |
| 2011/0287801 A1 | 11/2011 | Levin et al. |
| 2011/0296169 A1 | 12/2011 | Palmer |
| 2011/0319098 A1 | 12/2011 | Potorny et al. |
| 2012/0016902 A1 | 1/2012 | Ranjan et al. |
| 2012/0025976 A1 | 2/2012 | Richey et al. |
| 2012/0028650 A1 | 2/2012 | Cooper et al. |
| 2012/0030083 A1 | 2/2012 | Newman et al. |
| 2012/0032855 A1 | 2/2012 | Reede et al. |
| 2012/0052883 A1 | 3/2012 | Austin et al. |
| 2012/0052884 A1 | 3/2012 | Bogatin |
| 2012/0062415 A1 | 3/2012 | Hwang et al. |
| 2012/0087338 A1 | 4/2012 | Brandt et al. |
| 2012/0099621 A1 | 4/2012 | Karlsson et al. |
| 2012/0115505 A1 | 5/2012 | Miyake et al. |
| 2012/0139782 A1 | 6/2012 | Gutt et al. |
| 2012/0144452 A1 | 6/2012 | Dyor et al. |
| 2012/0144457 A1 | 6/2012 | Counterman |
| 2012/0158289 A1 | 6/2012 | Brush et al. |
| 2012/0182180 A1 | 7/2012 | Wolf et al. |
| 2012/0182874 A1 | 7/2012 | Siomina et al. |
| 2012/0185309 A1 | 7/2012 | Kakarla et al. |
| 2012/0214509 A1 | 8/2012 | Levin et al. |
| 2012/0221232 A1 | 8/2012 | Shang et al. |
| 2012/0287911 A1 | 11/2012 | Takano et al. |
| 2012/0302254 A1 | 11/2012 | Charbit et al. |
| 2012/0317500 A1 | 12/2012 | Kosseifi et al. |
| 2012/0323703 A1 | 12/2012 | Hillier et al. |
| 2012/0327869 A1 | 12/2012 | Wang et al. |
| 2013/0007058 A1 | 1/2013 | Meredith et al. |
| 2013/0023237 A1 | 1/2013 | Meredith et al. |
| 2013/0023247 A1 | 1/2013 | Bolon et al. |
| 2013/0023274 A1 | 1/2013 | Meredith et al. |
| 2013/0023281 A1 | 1/2013 | Meredith et al. |
| 2013/0053057 A1 | 2/2013 | Cansino et al. |
| 2013/0066748 A1 | 3/2013 | Long |
| 2013/0095861 A1 | 4/2013 | Li et al. |
| 2013/0096966 A1 | 4/2013 | Barnes |
| 2013/0109407 A1 | 5/2013 | Tipton et al. |
| 2013/0114464 A1 | 5/2013 | Tarraf et al. |
| 2013/0122863 A1 | 5/2013 | Chen et al. |
| 2013/0137464 A1 | 5/2013 | Kramer et al. |
| 2013/0226451 A1 | 8/2013 | O'Neill et al. |
| 2013/0281111 A1* | 10/2013 | Syrjarinne ............ G01S 5/0252 455/456.1 |
| 2013/0288704 A1 | 10/2013 | Wirola et al. |
| 2013/0310075 A1* | 11/2013 | Lim ...................... H04W 4/025 455/456.2 |
| 2013/0324149 A1 | 12/2013 | Fix et al. |
| 2013/0337824 A1 | 12/2013 | Meredith et al. |
| 2013/0337826 A1 | 12/2013 | Fix et al. |
| 2014/0062782 A1 | 3/2014 | Abraham |
| 2014/0106779 A1 | 4/2014 | Arslan et al. |
| 2014/0122220 A1 | 5/2014 | Bradley et al. |
| 2014/0171060 A1 | 6/2014 | Cook et al. |
| 2014/0278744 A1 | 9/2014 | Lo Faro et al. |
| 2014/0295881 A1 | 10/2014 | Werner et al. |
| 2015/0011249 A1 | 1/2015 | Siliski et al. |

FOREIGN PATENT DOCUMENTS

| | | |
|---|---|---|
| JP | 2004069609 A | 3/2004 |
| JP | 2005091303 A | 4/2005 |
| JP | 2007328050 A | 12/2007 |
| WO | WO2006031035 A1 | 3/2006 |

OTHER PUBLICATIONS

Office Action dated Aug. 28, 2014 for U.S. Appl. No. 13/526,988, 83 pages.

Office Action dated Sep. 22, 2014 for U.S. Appl. No. 13/175,199, 62 pages.

Office Action dated Oct. 17, 2014 for U.S. Appl. No. 13/204,535, 47 pages.

Office Action dated Oct. 20, 2014 for U.S. Appl. No. 13/494,959, 64 pages.

Office Action dated Oct. 22, 2014 for U.S. Appl. No. 13/557,425, 59 pages.

Office Action dated Aug. 11, 2014 for U.S. Appl. No. 14/279,176, 22 pages.

Office Action dated Nov. 14, 2014 for U.S. Appl. No. 13/277,595, 74 pages.

Notice of Allowance dated Nov. 20, 2014 for U.S. Appl. No. 13/866,909, 27 pages.

Notice off Allowance dated Dec. 9, 2014 for U.S. Appl. No. 12/958,146, 48 pages.

Office Action dated Dec. 11, 2014 for U.S. Appl. No. 13/447,072, 28 pages.

Office Action dated Dec. 1, 2014 for U.S. Appl. No. 13/495,756, 76 pages.

Office Action dated Jan. 7, 2015 for U.S. Appl. No. 13/557,425, 30 pages.

Notice of Allowance dated Jan. 21, 2015 for U.S. Appl. No. 13/495,391, 98 pages.

Notice of Allowance dated Feb. 6, 2015 for U.S. Appl. No. 13/204,535, 20 pages.

Office Action dated Feb. 13, 2015 for U.S. Appl. No. 14/516,286, 62 pages.

Girardin, et al., "Digital footprinting: Uncovering tourists with user generated content." Pervasive Computing, IEEE 7.4, Oct.-Nov. 2008. 8 pages.

Steinfield, "The development of location based services in mobile commerce." ELife after the Dot Com Bust. PhysicaVerlagHD, 2004. 15 pages.

Sevtsuk, et al., "Does urban mobility have a daily routine? Learning from the aggregate data of mobile networks." Journal of Urban Technology, vol. 17, No. 1, Apr. 2010: 20 pages.

Buhalis, et al., "Information communication technology revolutionizing tourism." Tourism Recreation Research, vol. 30, No. 3, 2005. 10 pages.

Ratti, et al. "Mobile Landscapes: using location data from cell phones for urban analysis." Environment and Planning 3: Planning and Design, vol. 33, 2006, 23 pages.

Office Action dated Nov. 11, 2015 for U.S. Appl. No. 13/557,425, 32 pages.

Office Action dated Apr. 16, 2015 for U.S. Appl. No. 14/521,431, 82 pages.

Notice of Allowance dated Mar. 19, 2015 for U.S. Appl. No. 13/494,959, 41 pages.

Notice of Allowance dated Mar. 26, 2015 for U.S. Appl. No. 14/276,688, 75 pages.

Office Action dated May 1, 2015 for U.S. Appl. No. 13/557,425, 33 pages.

Office Action dated May 14, 2015 for U.S. Appl. No. 14/530,605, 72 pages.

Office Action dated Jun. 1, 2015 for U.S. Appl. No. 13/447,072, 38 pages.

Office Action dated Jun. 6, 2015 for U.S. Appl. No. 14/516,286, 20 pages.

Office Action dated May 20, 2015 for U.S. Appl. No. 13/526,988, 52 pages.

(56) References Cited

OTHER PUBLICATIONS

Office Action dated Jun. 9, 2015 for U.S. Appl. No. 13/495,756, 35 pages.
Notice of Allowance dated Jul. 8, 2015 for U.S. Appl. No. 14/548,901, 125 pages.
Buford, et al, "Location Privacy Enforcement in a Location-Based Services Platform," IEEE, 2009, 5 pages.
Phillips, Jr., et al., "Information Sharing and Security in Dynamic Coalitions," ACM, 2002, pp. 87-96, 10 pages.
Vioniruzzaman, et al., "A Study of Privacy Policy Enforcement in Access Control Models", Proceedings of 13th International Conference on Computer and Information Technology IEEE, 2010, pp. 352-357, 6 pages.
Office Action dated Jul. 22, 2015 for U.S. Appl. No. 13/188,136, 31 pages.
"Cell_DCH", in INACON Glossary, published online at [http://www.inacon.de/glossary/CELL_DCH.php] retrieved Jul. 22, 2015, 1 page.
Office Action dated Sep. 17, 2015 for U.S. Appl. No. 13/495,756, 23 pages.
Office Action dated Sep. 14, 2015 for U.S. Appl. No. 13/557,425, 32 pages.
Office Action dated Sep. 18, 2015 for U.S. Appl. No. 14/641,247, 69 pages.
Notice of Allowance dated Aug. 27, 2015 for U.S. Appl. No. 14/521,431, 39 pages.
Office Action dated Nov. 16, 2015 for U.S. Appl. No. 13/188,136, 31 pages.
"Error", The American Heritage(R) Dictionary of the English Language, 2011, Houghton Mifflin Company, Boston, MA, 2 pages. Retrieved from [http://search.credoreference.com/contentientry/hmdictenglang/error/O] on Nov. 16, 2015.
Office Action dated Nov. 23, 2015 for U.S. Appl. No. 14/520,287, 80 pages.
Office Action dated Nov. 16, 2015 for U.S. Appl. No. 14/566,657, 87 pages.
Office Action dated Dec. 18, 2015 for U.S. Appl. No. 14/548,901, 35 pages.
Office Action dated Dec. 31, 2015 for U.S. Appl. No. 14/952,609, 32 pages.
Office Action dated Dec. 1, 2015 for U.S. Appl. No. 13/526,988, 43 pages.
Office Action dated Nov. 30, 2015 for U.S. Appl. No. 13/447,072, 45 pages.
Office Action dated Jan. 11, 2016 for U.S. Appl. No. 13/175,199, 29 pages.
Office Action dated Apr. 8, 2014 for U.S. Appl. No. 13/175,199, 52 pages.
Office Action dated Apr. 23, 2014 for U.S. Appl. No. 13/291,917, 29 pages.
Office Action dated Apr. 22, 2014 for U.S. Appl. No. 13/447,069, 51 pages.
Office Action dated Sep. 20, 2012 for U.S. Appl. No. 12/870,254, 29 pages.
Office Action dated May 14, 2014 for U.S. Appl. No. 13/660,689, 62 pages.
Office Action dated May 9, 2014 for U.S. Appl. No. 13/188,136, 33 pages.
Squires, "Practical Physics", Cambridge University Press, p. 12, 1986, 3 pages.
Represent (2000). In Collins English dictionary. Retrieved on May 9, 2014 from http://search.credoreference.com/content/entry/hcengdict/represent/0, 2 pages.
Represent. (2001). In Chambers 21st century dictionary. Retrieved on May 9, 2014 from http://search.credoreference.com/content/entry/chambdict/represent/O.
Represent. (2011). In the American heritage dictionary of the English language. Retrieved on May 9, 2014 from http://search.credoreference.com/content/entry/hmdictenglang/represent/0.
Office Action dated May 20, 2014 for U.S. Appl. No. 13/551,369, 29 pages.
Office Action dated May 30, 2014 for U.S. Appl. No. 13/277,595, 49 pages.
Office Action dated Jun. 3, 2014 for U.S. Appl. No. 13/523,770, 53 pages.
Office Action dated Jun. 6, 2014 for U.S. Appl. No. 13/447,072, 25 pages.
Office Action dated Apr. 3, 2014 for U.S. Appl. No. 13/188,295, 37 pages.
Office Action dated Jun. 18, 2014 for U.S. Appl. No. 13/305,276, 26 Pages.
Office Action dated Jun. 26, 2014 for U.S. Appl. No. 13/557,425, 24 pages.
Office Action dated Jun. 30, 2014 for U.S. Appl. No. 13/305,267, 44 pages.
Office Action dated Jul. 22, 2014 for U.S. Appl. No. 12/958,146, 38 pages.
Notice of Allowance dated Jul. 22, 2014 for U.S. Appl. No. 13/525,065, 82 pages.
Notice of Allowance dated Jul. 7, 2014 for U.S. Appl. No. 13/188,295, 51 pages.
Notice of Allowance dated Jul. 22, 2014 for U.S. Appl. No. 13/188,300, 49 pages.
Office Action dated Aug. 8, 2014 for U.S. Appl. No. 13/284,497, 48 pages.
Office Action dated Mar. 11, 2016 for U.S. Appl. No. 14/743,076, 86 pages.
Notice of Allowance dated Mar. 16, 2016 for U.S. Appl. No. 14/520,287, 23 pages.
Office Action dated Mar. 18, 2016 for U.S. Appl. No. 13/447,072, 37 pages.
Action dated Apr. 5, 2016 for U.S. Appl. No. 13/188,136, 33 pages.
Action dated Apr. 13, 2016 for U.S. Appl. No. 14/877,915, 76 pages.
Office Action dated May 17, 2016 for U.S. Appl. No. 15/074,622, 18 pages.
Action dated Jun. 10, 2016 for U.S. Appl. No. 14/548,901, 33 pages.
Action dated Jun. 22, 2016 for U.S. Appl. No. 14/970,533, 84 pages.
Office Action dated Jun. 28, 2016 for U.S. Appl. No. 15/132,220, 17 pages.
Notice of Allowance dated Jul. 19, 2016 for U.S. Appl. No. 14/952,609, 99 pages.
Office Action dated Aug. 24, 2016 for U.S. Appl. No. 14/676,066, 107 pages.
Office Action dated Aug. 25, 2016 for U.S. Appl. No. 13/447,072, 38 pages.
Office Action dated Sep. 30, 2016 for U.S. Appl. No. 14/957,525, 72 pages.
Notice of Allowance dated Oct. 7, 2016 for U.S. Appl. No. 14/548,901, 45 pages.
Office Action dated Oct. 12, 2016 for U.S. Appl. No. 14/877,915, 34 pages.
Notice of Allowance dated Nov. 16, 2016 for U.S. Appl. No. 15/186,410, 80 pages.
Office Action dated Dec. 28, 2016 for U.S. Appl. No. 13/447,072, 34 pages.
Office Action dated Feb. 14, 2017 for U.S. Appl. No. 14/641,242, 120 pages.
Office Action dated Jan. 13, 2017 for U.S. Appl. No. 14/601,800, 95 pages.
Office Action dated Jan. 26, 2017 for U.S. Appl. No. 14/877,915, 30 pages.
Office Action dated Feb. 15, 2017 for U.S. Appl. No. 15/191,877, 104 pages.
Office Action dated Feb. 27, 2017 for U.S. Appl. No. 15/132,220, 91 pages.
Notice of Allowance dated Apr. 10, 2017 for U.S. Appl. No. 14/676,066, 33 pages.
Notice of Allowance dated May 19, 2017 for U.S. Appl. No. 15/261,841, 83 pages.
Office Action dated Jun. 19, 2017 for U.S. Appl. No. 13/447,072, 47 pages.

(56) References Cited

OTHER PUBLICATIONS

Office Action dated Jun. 12, 2017 for U.S. Appl. No. 15/132,220, 25 pages.
3rd Generation Partnership Project, Technical Specification, "Group GSM/EDGE Radio Access Network, Radio subsystem synchronization (Release 8)", 3GPP TS 45.010 V8.0.0 (May 2008), last viewed Jul. 1, 2009, 30 pages.
3rd Generation Partnership Project, Technical Specification, "Group Radio Access Network, UTRAN Iuh interface Home Node B Application Part (HNBAP) signalling (Release 8)", 3GPP TS 25.469 V8.0.0 (Dec. 2008), last viewed Jul. 1, 2009, 56 pages.
Sullivan, Mark. "Signs and Wonders: Is AT&T Stepping Up Its Game?" PC World, Dec. 10, 2009, 1 page.
Etsi Ts 125 215 V6.4.0 (Sep. 2005). Universal Mobile Telecommunications System (UMTS), Physical layer, Measurements (FDD), 3GPP TS 25.215 version 6.4.0 Release 6). Last accessed Jun. 18, 2010, 20 pages.
Etsi Ts 125 331 V6.9.0 (Mar. 2006). Universal Mobile Telecommunications System (UMTS), Radio Resource Control (RRC) protocol specification, (3GPP TS 25.331 version 6.9.0 Release 6). Last accessed Jun. 18, 2010, 1211 pages.
New Devices Aim to Disable Cell Phones While Driving. FOXNews.com, Jan. 18, 2009. http://www.foxnews.com/printer_friendly_story/0,3566,480585,00.html. Last accessed Nov. 24, 2010, 2 pages.
Cortes, et al. "Support-Vector Networks", Machine Learning, 20, 1995. http://www.springerlink.com/content/k238jx04hm87j80g/fulltext.pdf. Last accessed Dec. 24, 2010, 25 pages.
ACM Website, Press release of Mar. 17th 2009. http://www.acm.org/press-room/news-releases/pdfs/awards-08-groupa1.pdf. Last accessed Dec. 24, 2010, 3 pages.
Boser, et al. A training algorithm for optimal margin classifiers. In D. Haussler, editor, 5th Annual ACM Workshop on COLT, pp. 144-152, Pittsburgh, PA, 1992. ACM Press.http://citeseerxist.psu.edu/viewdoc/summary? doi=10.1 .1.21.3818. Last accessed Dec. 24, 2010, 9 pages.
Hsu, et al. A Practical Guide to Support Vector Classification. Department of Computer Science National Taiwan University, Last updated: Apr. 15, 2010.http://www.csie.ntu.edu.tw/~cjlin/papers/guide/guide.pdf. Last accessed Dec. 24, 2010, 16 pages.
Drucker, et al. Support Vector Regression Machines.http://scholargoogle.com/scholar?q=%22Support+Vector+Regression+Machines.%22. Last accessed Dec. 24, 2010, 7 pages.
Suykens, et al., "Least squares support vector machine classifiers", Neural Processing Letters, vol. 9, No. 3, Jun. 1999, pp. 293-300.
Ferris, et al. (2002). "Interior-point methods for massive support vector machines". SIAM Journal on Optimization 13: 783-804. doi:10.1137/S1052623400374379.
Meyer, et al. "The support vector machine under test." Neurocomputing 55(1-2): 169-186, 2003.
International Search Report for PCT Application No. US2011/026122, dated Sep. 10, 2011, 11 pages.
International Search Report for PCT Application No. US2011/026120, dated Sep. 9, 2011, 13 pages.
Charitanetra et al. "Mobile positioning location using E-OTD method for GSM network" Research and Development, 2003. Proceedings Student Conference on Putrajaya, Malaysia Aug. 25-26, 2003, pp. 319-324.
"Location Labs Powers Location-based Fraud Detection", All Points Blog, http://webcache.googleusercontent.com/search?hl=en&riz=1R2GFRE_enUS398&q=cache:trsMn9Sin6wJ:http://apb.directionsmag.com/entry/location-labs-powers-location-based-fraud-detection/162802+http%3A//apb.directionsmag.com/entry/location-labs-powers-location-based-. . .1&ct=clnk, Oct. 12, 2010.
"Location Based Fraud Detection", Finsphere Corporation, 2008-2010.
Fleishman. Using the Personal Hotspot on your AT & T iPhone. Published online Mar. 15, 2011. http://www. macworld.com/article/158556/2011/03/personal_hotspot_att . . . , 4 pages.
Fleischfresser. Never Stop at a Red-Light Again. Published online Aug. 30, 2011. http://www.smartplanet.com/blog/ . . . 2 pages.
Cellphone Networks and the Future of Traffic. Published online Mar. 2, 2011. http://m.wired.com/autopia/2011/03/cell-phone-networks-and-the-future-. . . 15 pages.
Intelligent Transportation System. Published online http://en.wikipedia.org/wiki/Intelligent_transportation_system, retrieved on Aug. 15, 2011, 7 pages.
Koukoumidis Emmanouil, Peh Li-Shiuan, Martonosi Margaret, SignalGuru: Leveraging Mobile Phones for Collaborative Traffic Signal Schedule Advisory, MobiSys'11, Jun. 28-Jul. 1, 2011, Bethesda, Maryland, USA. 14 pages.
Bitcarrier Technology. Published online at http://www.bitcarriercom/technology, retrieved on Aug. 15, 2011, 1 page.
Hao Peng, Ban Xuegang(Jeff). Estimating Vehicle Position in a Queue at Signalized Intersections Using Simple Travel Times from Mobile Sensors, retrieved Nov. 18, 2011. 6 pages.
Ban Xuegang(Jeff), Gruteser Marco. Mobile Sensor as Traffic Probes: Addressing Transportation Modeling and Privacy Protection in an Integrated Framework, dated Jan. 10, 2010, 17 pages.
Office Action for U.S. Appl. No. 12/836,471 dated Dec. 28, 2011, 34 pages.
Office Action dated Feb. 23, 2012 for U.S. Appl. No. 12/967,747, 31 pages.
Office Action dated Dec. 15, 2011 for U.S. Appl. No. 12/712,424, 34 pages.
Office Action dated Apr. 13, 2012 for U.S. Appl. No. 12/416,853, 36 pages.
Office Action dated Oct. 2, 2012 for U.S. Appl. No. 13/554,285, 19 pages.
Office Action dated Aug. 30, 2012 for U.S. Appl. No. 12/958,146, 40 pages.
MobileLutions Introduces MobiLoc-A Breakthrough Technology to Control Texting in the Mobile Workplace. Press release Oct. 10, 2010 by MobileLutions. 2 pages.
DriveAssist Frequently Ask question by Aegis Mobility, Wayback archive Jul. 12, 2010, 2 pages.
Office Action dated Jul. 30, 2012 for US Application No. 12/967,747, 28 pp.
Office Action dated Jul. 17, 2012 for U.S. Appl. No. 13/220,083, 57 pages.
Office Action dated Sep. 11, 2012 for U.S. Appl. No. 13/188,345, 44 pages.
Office Action dated Oct. 15, 2012 for U.S. Appl. No. 13/523,778, 21 pages.
Office Action dated Dec. 20, 2012 for U.S. Appl. No. 12/958,146, 23 pages.
Office Action dated Dec. 28, 2012 for U.S. Appl. No. 13/188,295, 37 pages.
Office Action dated Jan. 3, 2013 for U.S. Appl. No. 13/188,300, 36 pages.
Office Action dated Nov. 8, 2012 for U.S. Appl. No. 13/204,535, 30 pages.
Office Action dated Jan. 25, 2013, for U.S. Appl. No. 13/554,285, 20 pgs.
Office Action dated Mar. 19, 2013, for U.S. Appl. No. 13/174,541, 46 pgs.
Office Action dated Feb. 13, 2013, for U.S. Appl. No. 13/220,083, 48 pgs.
Office Action dated Feb. 22, 2013, for U.S. Appl. No. 13/188,345, 45 pgs.
Office Action dated Mar. 15, 2013, for U.S. Appl. No. 13/204,535, 18 pgs.
Office Action dated Mar. 19, 2013, for U.S. Appl. No. 13/284,497, 46 pgs.
Office Action dated Apr. 19, 2013, for U.S. Appl. No. 13/277,595, 58 pages.
Notice of Allowance dated Aug. 12, 2013, for U.S. Appl. No. 13/174,541, 40 pages.
Office Action dated Aug. 2, 2013, for U.S. Appl. No. 13/188,295, 26 pages.
Office Action dated Aug. 2, 2013, for U.S. Appl. No. 13/188,300, 38 pages.

(56) References Cited

OTHER PUBLICATIONS

Office Action dated Jun. 20, 2013, for U.S. Appl. No. 13/219,911, 61 pages.
Office Action dated Jul. 17, 2013, for U.S. Appl. No. 13/188,345, 27 pages.
Office Action dated Jun. 20, 2013, for U.S. Appl. No. 13/291,917, 52 pages.
Office Action dated May 31, 2013, for U.S. Appl. No. 13/523,770, 40 pages.
Office Action dated Sep. 19, 2013, for U.S. Appl. No. 13/927,020, 30 pages.
Office Action dated Oct. 2, 2013 for U.S. Appl. No. 12/958,146, 31 pages.
Office Action dated Sep. 26, 2013 for U.S. Appl. No. 13/284,456, 58 pages.
RouteFinder 3.00 for ArGIS Documentation, 2007, Routeware and Higher Mapping Solutions, 71 pages, downloaded from http://www.routeware.dk/download/routefinder_arcgis.pdf.
mySociety (Web page), "More travel-time maps and their uses", 2007, downloaded from http://www.mySociety.org/2007/more-travel-maps/, 10 pages total (including a single page Examiner's attachment showing the operation of the interactive travel-time map).
Wayback machine archive from Jan. 21, 2009 of the mySociety Web page, "More travel-time maps and their uses", Downloaded from http://web.archive.org/web/20090121193615/http://www.mysociety.org/2007/more-travel-maps/, 11 pages.
Street, Nicholas, "TimeContours: Using isochrone visualisation to describe transport network travel cost", Final Report, Jun. 14, 2006, Department of Computing Imperial College London, 97 pages. Downloaded from http://www.doc.ic.ac.uk/teaching/projects/Distinguished06/nicholasstreet.pdf.
Office Action dated Nov. 5, 2013 for U.S. Appl. No. 13/188,136, 47 pages.
Office Action dated Sep. 18, 2013, for U.S. Appl. No. 13/284,497, 30 pages.
Office Action dated Aug. 22, 2013, for U.S. Appl. No. 13/277,595, 36 pages.
Office Action dated Oct. 21, 2013, for U.S. Appl. No. 13/523,770, 24 pages.
Office Action dated Nov. 5, 2013 for U.S. Appl. No. 13/188,345, 30 pages.
Office Action dated Dec. 11, 2013, for U.S. Appl. No. 13/188,295, 52 pages.
Office Action dated Dec. 24, 2013, for U.S. Appl. No. 13/188,300, 44 pages.
Office Action dated Dec. 11, 2013, for U.S. Appl. No. 13/291,917, 34 pages.
Office Action dated Jan. 15, 2014 for U.S. Appl. No. 13/219,911, 38 pages.
Office Action dated Jan. 28, 2014, for U.S. Appl. No. 12/958,146, 24 pages.
Notice of Allowance dated Feb. 14, 2014 for U.S. Appl. No. 13/284,456, 30 pages.
Office Action dated Feb. 24, 2014, for U.S. Appl. No. 13/927,020, 18 pages.
Office Action dated May 21, 2013 for U.S. Appl. No. 13/305,276, 28 pages.
Office Action dated Oct. 24, 2012 for U.S. Appl. No. 13/305,276, 37 pages.
"Locate your friends in real time with Google Latitude." http://googlemobile.blogspot.com/2009/02/locate-your-friends-in-real-time-with.html. Last accessed Mar. 8, 2012, 23 pages.
"Location sharing and updating." http://support.google.com/mobile/bin/answer.py?hl=en&answer=136647. Last accessed Mar. 8, 2012, 3 pages.
"Privacy Settings." http://support.google.com/mobile/bin/answer.py?hl=en&answer=136650, Last accessed Mar. 8, 2012, 1 page.
Office Action dated Nov. 25, 2013 for U.S. Appl. No. 13/447,069, 40 pages.
Office Action dated May 9, 2013 for U.S. Appl. No. 13/447,069, 33 pages.
Tsai, et al, "Location-Sharing Technologies: Privacy Risks and Controls." Feb. 2010. Retrieved on May 10, 2013, 26 pages.
Li et al, "Sharing Location in Online Social Networks". IEEE Network, Sep./Oct. 2010; 0890-8044/10/$25.00 (c)2010 IEEE. Retrieved on May 10, 2013, 6 pages.
Tsai, et al, "Who's Viewed You? The Impact of Feedback in a Mobile Location-Sharing Application". CHI 2009—Security and Privacy, Apr. 9th, 2009—Boston, MA, USA. Retrieved on May 10, 2013, 10 pages.
Pettersen, et al., "Automatic antenna tilt control for capacity enhancement in UMTS FDD." Retrieved on Mar. 25, 2012, 5 pages.
Islam, et al., "Self-Optimization of Antenna Tilt and Pilot Power for Dedicated Channels." Retrieved on Mar. 25, 2012, 8 pages.
Bigham, et al., "Tilting and Beam-shaping for Traffic Load Balancing in WCDMA Network." Retrieved on Mar. 25, 2012, 4 pages.
3GPP TS 25.215 V6.4.0 (Sep. 2005) Physical Layer Measurements, Sep. 2005.
3GPP TS 25.331 V6.9.0 (Mar. 2006) RRC protocol for the UE-UTRAN radio interface, Mar. 2006.
3GPP TS 25.413 V6.9.0 (Mar. 2006) UTRAN Iu interface RANAP signalling, Mar. 2006.
Calabrese, et al., "Real-Time Urban Monitoring Using Cell Phones: A Case Study in Rome". IEEE Transactions on Intelligent Transportation Systems, 12 pages. (http://senseable.mit.edu/papers/pdf/2010_Calabrese_et_al_Rome_TITS.pdf). Retrieved on Sep. 29, 2012, 11 pages.
Smith, et al., "Airsage Overview", (http://mikeontraffic.typepad.com/files/raleigh-winter-2011-presentation-v11-final.pdf) Retrieved on Sep. 29, 2012, 39 pages.
Office Action dated Feb. 5, 2014 for U.S. Appl. No. 13/526,988, 56 pages.
Marko Silventoinen, Timo Rantalainen, "Mobile Station Locating in GSM" Helsinki, Finland, Last accessed on Nov. 15, 2011, 7 pages.
Office Action dated Dec. 30, 2013 for U.S. Appl. No. 13/305,267, 10 pages.
Office Action dated Mar. 25, 2014 for U.S. Appl. No. 13/488,144, 60 pages.
Interview Summary dated Feb. 3, 2014 for U.S. Appl. No. 13/188136, 10 pages.
Rabinowitz, et al., A new positioning system using television synchronization signals, IEEE Transactions on Broadcasting, vol. 51(1), p. 51-61, Mar. 2005.
Office Action dated Jul. 5, 2017 for U.S. Appl. No. 15/191,877, 32 pages.
Office Action dated Jul. 25, 2017 for U.S. Appl. No. 15/422,147, 86 pages.

* cited by examiner

GEOGRAPHIC REDUNDANCY DETERMINATION FOR TIME BASED LOCATION INFORMATION IN A WIRELESS RADIO NETWORK

CROSS-REFERENCE TO RELATED APPLICATIONS

This application is a continuation of, and claims priority to each of, U.S. patent application Ser. No. 15/186,410, filed on 17 Jun. 2016, now issued as U.S. Pat. No. 9,615,349, and entitled "GEOGRAPHIC REDUNDANCY DETERMINATION FOR TIME BASED LOCATION INFORMATION IN A WIRELESS RADIO NETWORK," which is a continuation of U.S. patent application Ser. No. 14/520,287, filed on 21 Oct. 2014, now issued as U.S. Pat. No. 9,398,556, and entitled "GEOGRAPHIC REDUNDANCY DETERMINATION FOR TIME BASED LOCATION INFORMATION IN A WIRELESS RADIO NETWORK," which is a continuation of U.S. patent application Ser. No. 13/525,065, filed on 15 Jun. 2012, now issued as U.S. Pat. No. 8,897,805, and entitled "GEOGRAPHIC REDUNDANCY DETERMINATION FOR TIME BASED LOCATION INFORMATION IN A WIRELESS RADIO NETWORK," the entireties of which applications are hereby incorporated by reference herein.

TECHNICAL FIELD

The disclosed subject matter relates to a determining geographic redundancy in a wireless radio network, e.g., determination of geographically redundant radios employed in determining time based location information in a wireless radio network.

BACKGROUND

In mobile equipment networks, locating user equipments (UEs) can provide valuable additional benefits to users and opportunities for additional or improved services. Locating UEs in a wireless network can facilitate providing location-centric services or information in relation to the UE, such as E911 services, mapping services, or traffic information services, among many others. Additionally, UE location information can be employed to improve network performance, to troubleshoot networks, by law enforcement, to aggregate valuable demographic information, or nearly a limitless number of other uses. Network timing delays include site timing delay in the wireless signal path among radio component(s) at the wireless base station and a sector antenna. Network timing delays further include delays that can arise from various mismatches (e.g., impedance mismatch) among electronic elements and components, stray capacitances and inductances, length of the antenna(s) cable(s) in base station(s); tower height of base station, signal path scattering, or "signal bounces," such as multipath or strong reflections, and the like. Propagation delay between a UE and a NodeB is conventionally assumed to be negligible with respect to timing delay. However, depending on the architecture of the serving base station and covered sector antenna(s), signal propagation delay can be non-negligible, particularly in distributed antenna systems and low-power wireless radio cells and cause error in UE location determinations for traditional methods.

DETAILED DESCRIPTION

Figure 1:
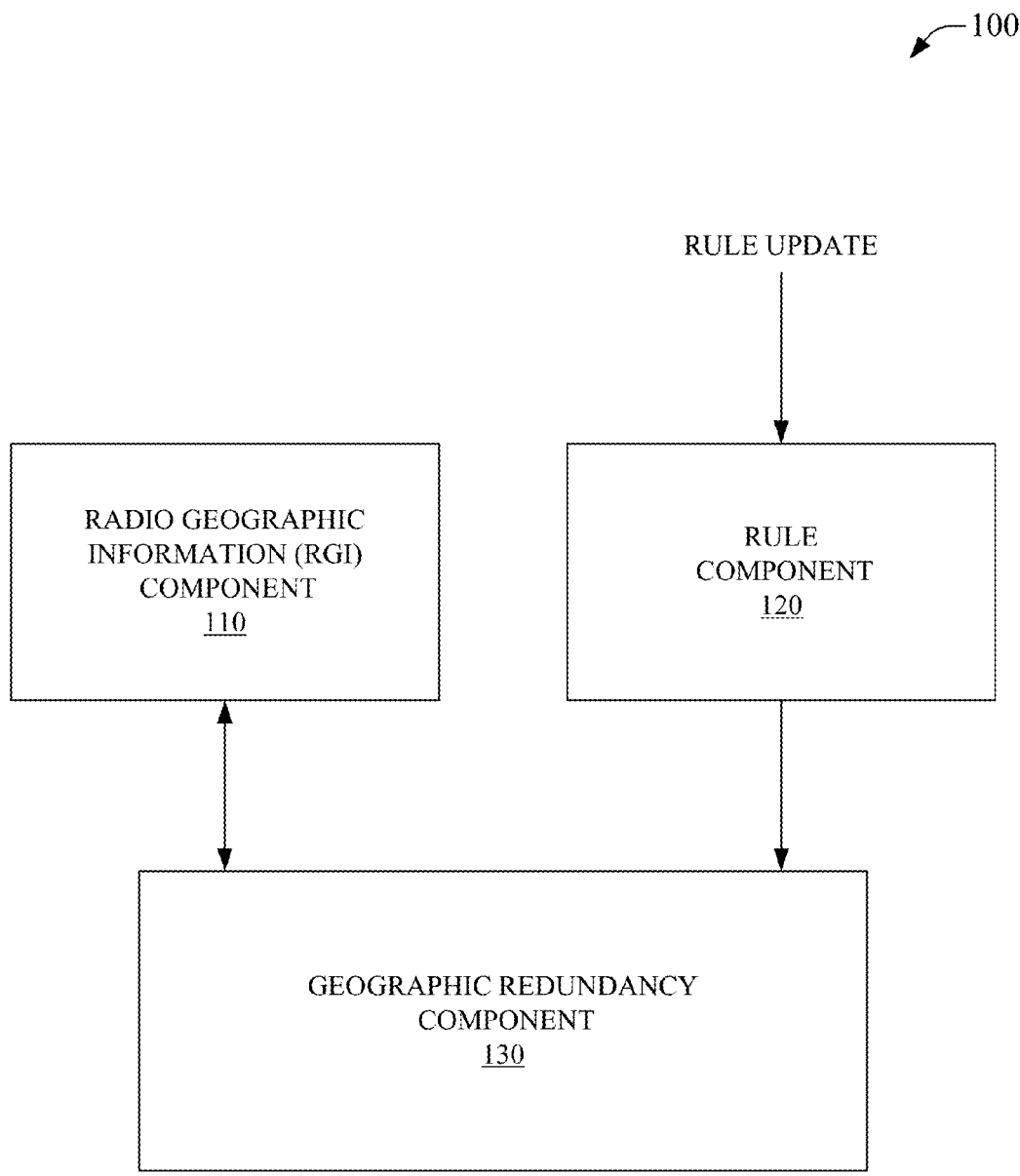
FIG. 1 is an illustration of a system that facilitates determining a level of geographic redundancy in accordance with aspects of the subject disclosure.

The subject disclosure is now described with reference to the drawings, wherein like reference numerals are used to refer to like elements throughout. In the following description, for purposes of explanation, numerous specific details are set forth in order to provide a thorough understanding of the subject disclosure. It may be evident, however, that the subject disclosure may be practiced without these specific details. In other instances, well-known structures and devices are shown in block diagram form in order to facilitate describing the subject disclosure.

By way of brief background, a network locating system (NELOS) can employ timed fingerprint location (TFL). TFL, as disclosed in U.S. patent application Ser. No. 12/712,424, can facilitate determining location information based, in part, on receiving timing measurements between at least a pair of wireless network radios and a device. In an aspect, determining location information in a NELOS-enabled system, e.g., a system employing TFL, benefits from employing one or more timing measurements for a non-redundant radio link with a device, e.g., timing measurements associated with radio links between a NodeB site pair (NBSP) and a mobile device. Non-redundant radio links can generally employ non-redundant radios. A radio can be associated with a level of redundancy where, geographically, two or more radios are close enough to each other that they result in highly similar timing measurements for use in location information determination. In an aspect, while radios that are close together can be employed in determining location information, they generally will have greater error in a location determination information that radios that are not geographically redundant. As an example, radio pairs, e.g., NBSPs, with geographically redundant radios in a TFL-enabled system can yield results from a query that are highly similar and thus, determining an intersection of those query results can have a lower level of confidence than would be associated with query results from NBSPs with non-redundant radios.

A NELOS can employ TFL technologies that can include location information or timing information as disclosed herein and as further disclosed in more detail in U.S. Ser. No. 12/712,424 filed Feb. 25, 2010, which application is hereby incorporated by reference in its entirety. TFL information can facilitate access to location information for a mobile device, e.g., a UE. TFL information can be information from systems in a timed fingerprint location wireless environment, such as a TFL component of a wireless telecommunications carrier. As a non-limiting example, UEs, including mobile devices not equipped with a GPS-type system, can be associated with TFL information, which can facilitate determining a location for a UE based on the timing information associated with the UE.

In an aspect, TFL information can include information to determine a differential value for a radio, e.g., a NodeB site pair, and a bin grid frame, as disclosed in more detail in incorporated U.S. Ser. No. 12/712,424. A centroid region (possible locations between any site pair) for an observed time value associated with any NodeB site pair (NBSP) can be calculated and can be related to the determined value (in units of chip) from any pair of NodeBs. When UE time data is accessed, a value look-up can be initiated (e.g., a lookup for "DV(?,X)" as disclosed in more detail in the application incorporated herein by reference). Relevant NBSPs can be prioritized as part of the look-up. Further, the relevant pairs can be employed as an index to lookup a first primary set. As an example, time data for a UE can be accessed in relation to a locating event in a TFL wireless carrier environment. In this example, it can be determined that a NBSP, with a first reference frame, be used for primary set lookup with the computed DV(?,X) value as the index. This can return, for example, a set of bin grid frame locations forming a hyperbola correlating to the radios of the NBSP. A second lookup can then be performed for an additional relevant NBSP, using the same value DV(?,X), as an index into the data set. Continuing the example, the returned set for the look up with second NBSP can return a second set of bin grid frames. Thus, the UE is likely located in both sets of bin grid frames. Therefore, where the UE is likely in both sets, it is probable that the location for the UE is at an intersection of the two sets. Additional NBSPs can be included to further narrow the possible locations of the UE by providing additional intersections among relevant bin grid sets. As such, employing TFL information for location determination is demonstrably different from conventional location determination techniques or systems such as GPS, AGPS, triangulation or multilateration in wireless carrier environments, near field techniques, or proximity sensors.

In an embodiment, a system can include a processor and memory. The processor can facilitate the execution of computer-executable instructions stored on the memory. The processor can facilitate execution of the computer-executable instructions to determine a level of geographic redundancy for a first radio of a wireless network. The determined level of geographic redundancy can be based on geographic information relating to a set of radios, of the wireless network, including the first radio.

In another embodiment, a method can include determining, by a system including at least one processor, a level of geographic redundancy for a first radio of a wireless network. The determining of the level of geographic redundancy can be based on geographic information relating to a set of radios, of the wireless network, including the first radio.

In a further embodiment, a method can include receiving, by a system including at least one processor, predetermined information relating to levels of geographic redundancy for a set of radios of a wireless network. The method can further include determining, by the system, location information based on information relating to a selected radio. The selection of the radio can be based on the predetermined information relating to the levels of geographic redundancy for the set of radios of the wireless network.

To the accomplishment of the foregoing and related ends, the disclosed subject matter, then, comprises one or more of the features hereinafter more fully described. The following description and the annexed drawings set forth in detail certain illustrative aspects of the subject matter. However, these aspects are indicative of but a few of the various ways in which the principles of the subject matter can be employed. Other aspects, advantages and novel features of the disclosed subject matter will become apparent from the following detailed description when considered in conjunction with the drawings.

FIG. 1 is an illustration of a system 100, which facilitates adaptive calibration in accordance with aspects of the subject disclosure. System 100 can include radio geographic information (RGI) component 110 that can facilitate access to geographic information related to radios of a wireless network. In an aspect, wireless network carriers know the location at which the radios of the wireless network are placed as part of deploying the physical resources of a wireless network. In certain embodiments, geographic information for wireless network radios can be in the form of geographic information system (GIS) information. A geographic information system can be a system designed to handle types of geographical data. At a very basic level, GIS can be a mélange of cartography, statistical analysis, and database technology. RGI component 110 can enable, in some embodiments, interaction with GIS information. As a non-limiting example, RGI component 110 can facilitate receiving geographic position information for radio resources of a wireless network carrier by way of a coupling with the carrier's GIS system.

System 100 can further include rule component 120 that can facilitate access to one or more rules associated with determining a level of geographic redundancy. In an aspect, rules can relate to definition of, or characterization of geographic information as it relates to geographic redundancy. As an example, a rule can include one or more predetermined threshold values that correspond to different levels of redundancy. In a further aspect, rules can relate to boundary conditions related to determinations of geographic redundancy. As an example, in large sets of radios, a boundary condition can limit determining redundancy to radios within a predetermined distance, selected region, selected status, etc. Rule component 120 can also receive rule updates to facilitate changes to rule sets that affect the determination of levels of geographic redundancy.

System 100 can further include geographic redundancy component 130 to facilitate determination of a level of geographic redundancy. Geographic redundancy component 130 can be communicatively coupled to RGI component 110 to facilitate receiving geographic information for a set of radios associated with a wireless network. Geographic redundancy component 130 can also be communicatively coupled to rule component 120 to facilitate receiving at least a rule associated with determining a level of geographic redundancy for the set of radios associated with the wireless network.

In an aspect, geographic redundancy component 130 can determine a level of geographic redundancy. A level of geographic redundancy can be binary, e.g., redundant or not redundant, or can relate to a plurality of levels of redundancy, e.g., highly redundant, moderately redundant, slightly redundant, not redundant, etc. As an example, a determination of 'highly redundant' can be associated with not using the radio in location determination, while a determination of 'slightly redundant' can be associated with using the radio for location determination only when it is also a well calibrated radio. Additionally, a level of geographic redundancy can be employed to rank or order radios, or as a factor in other ranking or ordering techniques, etc. As an example, the higher the level of geographic redundancy, the lower the radio can be ranked for selection in determining location information. Continuing the example, other factors, such as calibration confidence, etc., can be associated with increasing the ranking of the radio for use in determining location information.

In a further aspect, the determined level of geographic redundancy can be employed to update radio information. Wherein the geometry of wireless network radios is known, the geographically redundant radios can be determined and the information can then be associated with the radios such that the information is predetermined with respect to determining location information based on timing information relating to the radios of the wireless network. This can facilitate selection of radios that meet predetermined ranking criteria associated with a predetermined level of geographic redundancy. As an example, a UE can be associated with a set of radio pairs facilitating a TFL information determination, the set including at least a pair of radios with a predetermined level of geometrically redundancy. In light of the predetermined level of redundancy, the exemplary TFL information determination can be based on radio pairs of the set of radios with lower levels of geometric redundancy to increase an overall level of confidence in the determined location information.

In a further aspect, geographic redundancy component 130 can determine levels of geometric redundancy for some, all, or no radios in a set of radios associated with RGI received by way of RGI component 110. In an embodiment, the selection of a subset of radios from a set of radios for which RGI is available can be a form of bounding. Bounding can allow, for example, predetermination of a level of geometric redundancy for radios within a predetermined distance from each other, etc. This can significantly reduce the number of determinations that are made in large sets of radios, e.g., determinations of radio sets for regions of a wireless network, etc.

Figure 2:
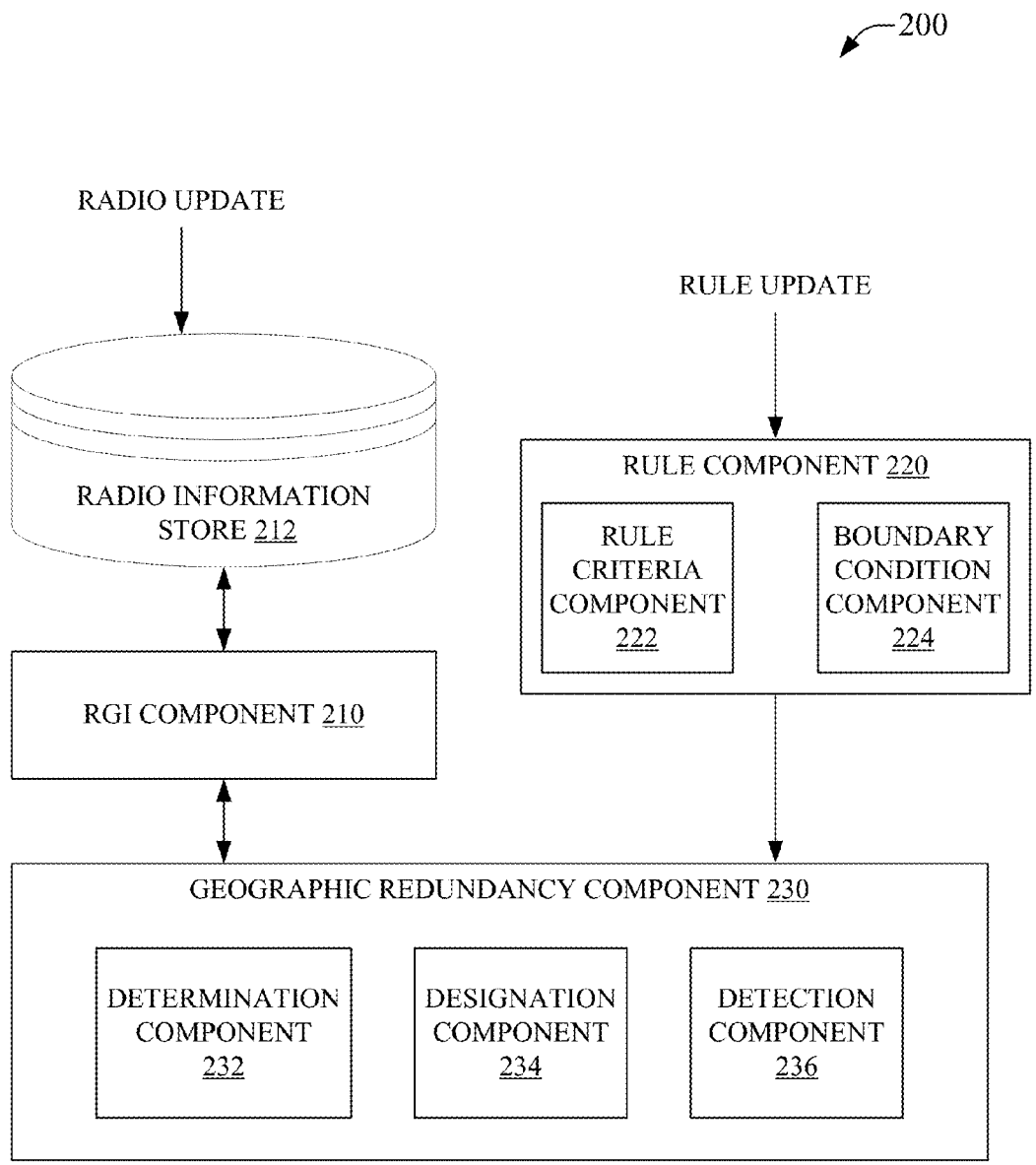
FIG. 2 is a depiction of a system that facilitates determining a level of geographic redundancy in accordance with aspects of the subject disclosure.

FIG. 2 is a depiction of a system 200 that can facilitate determining a level of geographic redundancy in accordance with aspects of the subject disclosure. System 200 can include RGI component 210 that can facilitate access to geographic information related to radios of a wireless network. RGI component 210 can enable, in some embodiments, interaction with GIS information.

RGI component 210 can be communicatively coupled to radio information store 212. Radio information store 212 can be a store of information relating to a radio of a wireless network of radios. In some embodiments, radio information store 212 can comprise part of a carrier's GIS. Radio information store 212 can warehouse information about radios including geographic information, levels of geographic redundancy, radio identification, radio timing values, radio calibration information, or nearly any other type of information relative to a radio of a wireless network. Radio information store 212 can receive updates to the radio information as a radio update, e.g., information relating to a new radio, removal of a radio, updating a radio information, etc.

System 200 can further include rule component 220 that can facilitate access to one or more rules associated with determining a level of geographic redundancy. Rule component 220 can include rule criteria component 222. In an aspect, rules can relate to definition of, or characterization of geographic information as it relates to geographic redundancy. As an example, a rule can include one or more predetermined threshold values that correspond to different levels of redundancy. Criteria for rules can be received by way of rule criteria component 222. As an example, an equation for determining a level of geographic redundancy can be received by way of rule criteria component 222. As another example, a rule for determining a level of geographic redundancy can be based on predetermined threshold values that can be received by way of rule criteria component 222.

Rule component 220 can further comprise boundary condition component 224. Boundary condition component 224 can receive information relating to a bounding condition. Rules can include boundary conditions related to determinations of geographic redundancy. As an example, in large sets of radios, a boundary condition can limit determining redundancy to radios within a predetermined distance, selected region, selected status, etc. Rule component 220 can also receive rule updates to facilitate changes to rule sets that affect the determination of levels of geographic redundancy.

System 200 can further include geographic redundancy component 230 to facilitate determination of a level of geographic redundancy. Geographic redundancy component 230 can be communicatively coupled to RGI component 210 to facilitate receiving geographic information for a set of radios associated with a wireless network. Geographic redundancy component 230 can also be communicatively coupled to rule component 220 to facilitate receiving at least a rule associated with determining a level of geographic redundancy for the set of radios associated with the wireless network.

In an aspect, geographic redundancy component 230 can determine a level of geographic redundancy. Determinations of a level of geometric redundancy can be made by determination component 232 and can be based on a rule received by way of rule component 220 and RGI by way of RGI component 210. A level of geographic redundancy can be employed to rank or order radios, or as a factor in other ranking or ordering techniques, etc.

In a further aspect, a determined level of geographic redundancy can be employed to update radio information. Designation component 234 can facilitate designation a level of geometric redundancy by facilitating access to information relating to the determined level of redundancy. Wherein the geometry of wireless network radios is known, geographically redundant radios can be determined and the information can then be associated with the radios such that the information is predetermined with respect to determining location information based on timing information relating to the radios of the wireless network. Thus, predetermined levels of geometric redundancy can be determined, at determination component 232, and information about said levels can be received, by way of designation component 234, for storage at radio information store 212 by way of RGI component 210. This can facilitate selection of radios that meet predetermined ranking criteria associated with a predetermined level of geographic redundancy.

In another aspect, geographic redundancy component 230 can determine levels of geometric redundancy for some, all, or no radios in a set of radios associated with RGI received by way of RGI component 210. In an embodiment, the selection of a subset of radios from a set of radios for which RGI is available can be a form of bounding. Bounding can allow, for example, predetermination of a level of geometric redundancy for radios within a predetermined distance from each other, etc. This can reduce the number of determinations that are made in large sets of radios.

Moreover, detection component 236 can determine if there have been changes to information relating to a set of radios, e.g., by communicative coupling with radio information store 212 by way of RGI component 210. Changes can include addition of a new radio, e.g., a new radio being installed in a wireless network, etc., deletion of a radio, or updates to an existing radio. Where changes in radios occur, the RGI and geometric redundancy can also be impacted. As such, a detected change can allow for an automatic redetermination of geometric redundancy information. Further, the automatic redetermination can be for part, all, or none of a radio set based on which radios are detected as having changed. As an example, where a single radio is added, this can influence a relative few determined levels of geometric redundancy. As another example, where a new region of wireless network is added, e.g., by way of acquiring another wireless carrier, etc., it can be more prudent to re-determine all or most of the geometric redundancy determinations.

Figure 3:
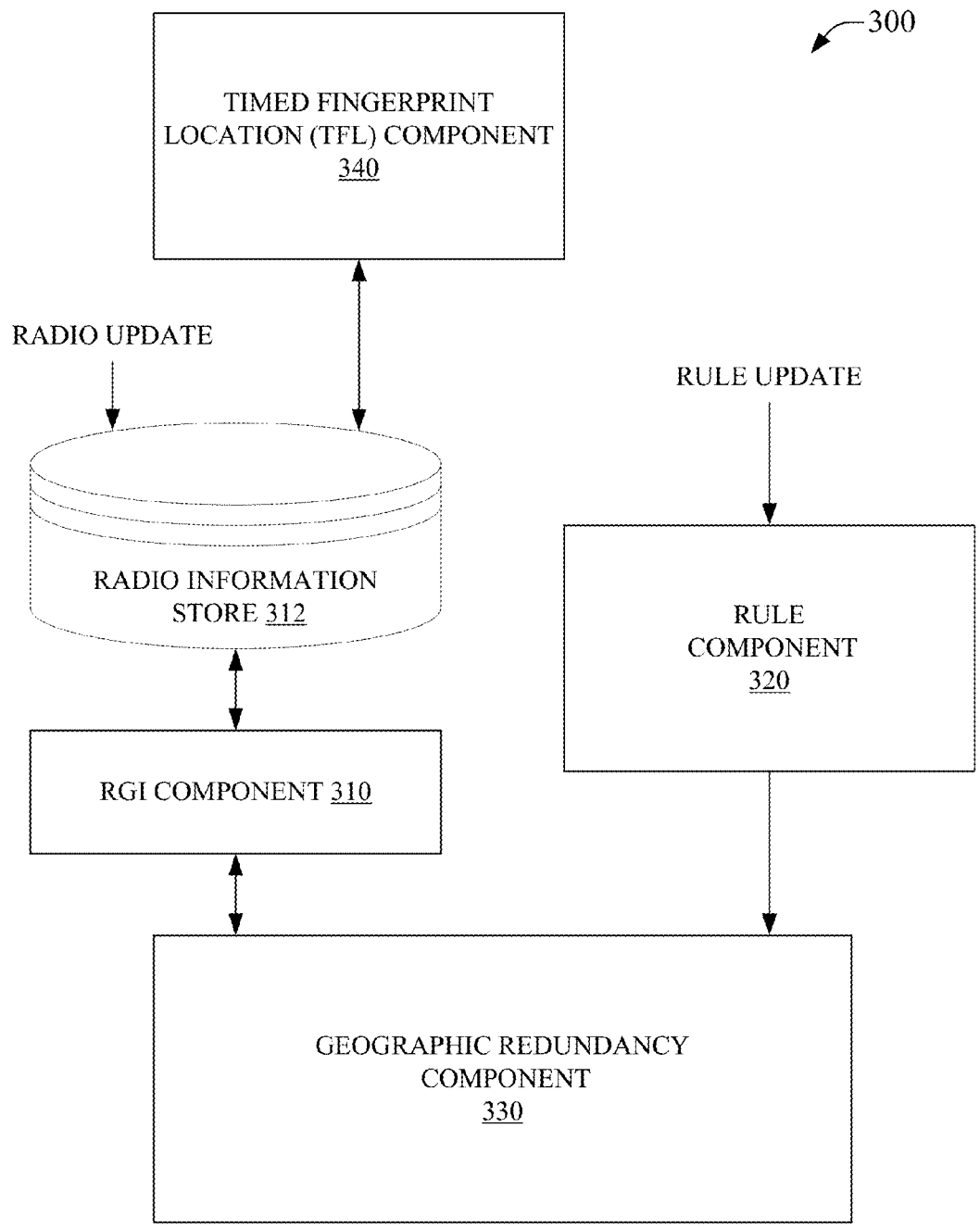
FIG. 3 illustrates a system that facilitates determining a level of geographic redundancy for a timed fingerprint locating enabled system in accordance with the disclosed subject matter.

FIG. 3 illustrates a system 300 that facilitates determining a level of geographic redundancy for a timed fingerprint locating enabled system in accordance with aspects of the subject disclosure. System 300 can include RGI component 310 that can facilitate access to geographic information related to radios of a wireless network. In certain embodiments, geographic information for wireless network radios can be in the form of GIS information. RGI component 310 can enable, in some embodiments, interaction with GIS information. In an aspect, RGI component 310 can be communicatively coupled to radio information store 312. Radio information store 312 can be a store of information relating to a radio of a wireless network of radios. In some embodiments, radio information store 312 can comprise part of a carrier's GIS. Radio information store 312 can warehouse information about radios including geographic information, levels of geographic redundancy, or nearly any other type of information relative to a radio of a wireless network. Radio information store 312 can receive updates to the radio information as a radio update.

System 300 can further include rule component 320 that can facilitate access to one or more rules associated with determining a level of geographic redundancy. In an aspect, rules can relate to definition of, or characterization of geographic information as it relates to geographic redundancy. In a further aspect, rules can relate to boundary conditions related to determinations of geographic redundancy. Rule component 320 can also receive rule updates to facilitate changes to rule sets that affect the determination of levels of geographic redundancy.

System 300 can further include geographic redundancy component 330 to facilitate determination of a level of geographic redundancy. Geographic redundancy component 330 can be communicatively coupled to RGI component 310 to facilitate receiving geographic information for a set of radios associated with a wireless network. Geographic redundancy component 330 can also be communicatively coupled to rule component 320 to facilitate receiving at least a rule associated with determining a level of geographic redundancy for the set of radios associated with the wireless network.

In an aspect, geographic redundancy component 330 can determine a level of geographic redundancy. A level of geographic redundancy can be employed to rank or order radios, or as a factor in other ranking or ordering techniques, etc. In an aspect, the determined level of geographic redundancy can be employed to update radio information. This can facilitate selection of radios that meet predetermined ranking criteria associated with a predetermined level of geographic redundancy.

In a another aspect, geographic redundancy component 330 can determine levels of geometric redundancy for some, all, or no radios in a set of radios associated with RGI received by way of RGI component 310. In an embodiment, the selection of a subset of radios from a set of radios for which RGI is available can be a form of bounding. Bounding can allow, for example, predetermination of a level of geometric redundancy for radios within a predetermined distance from each other, etc. This can significantly reduce the number of determinations that are made in large sets of radios, e.g., determinations of radio sets for regions of a wireless network, etc.

System 300 can further comprise timed fingerprint location (TFL) component 340. TFL component 340 can be communicatively coupled to radio information store 312 to receive predetermined geographic redundancy information stored thereon by way of geographic redundancy component 330. As such, geographic redundancy information can be employed in selection of radio pairs employed in determining location information by way of a TFL system, e.g., NELOS. As an example, a UE can be associated with a set of radio pairs facilitating a TFL information determination, the set including at least a pair of radios with a predetermined level of geometrically redundancy. In light of the predetermined level of redundancy, the exemplary TFL information determination can be based on radio pairs of the set of radios with lower levels of geometric redundancy to increase an overall level of confidence in the determined location information.

Figure 4:
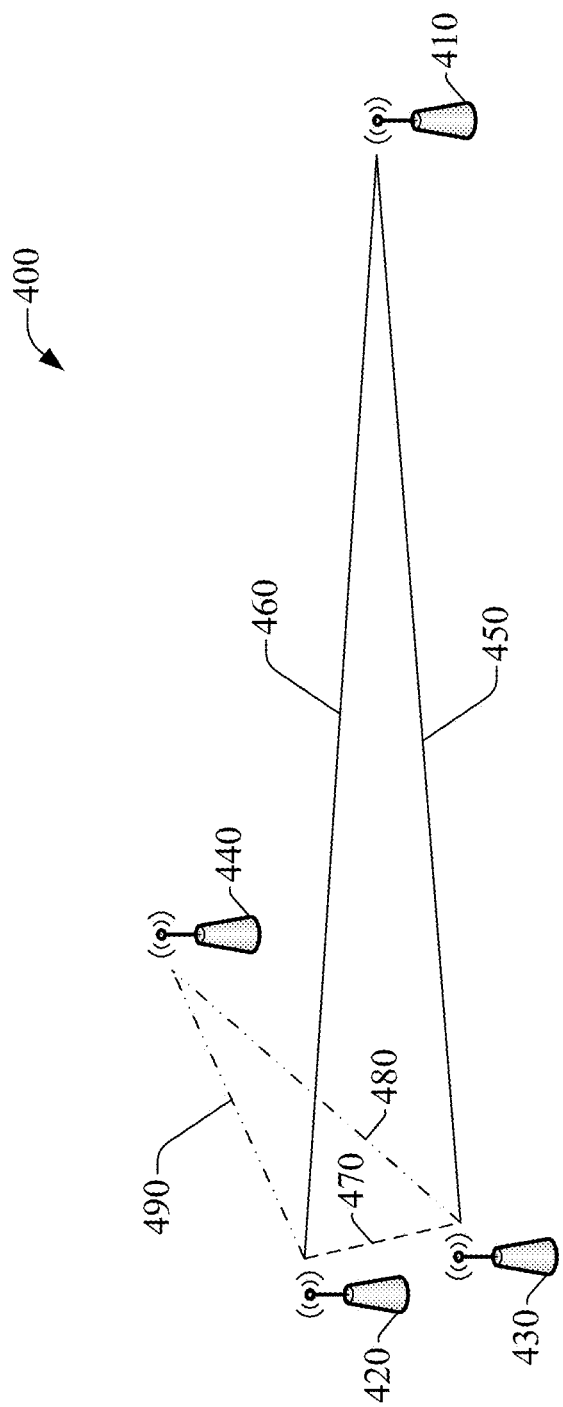
FIG. 4 is an illustration of an exemplary system having a level of geographic redundancy in accordance with aspects of the subject disclosure.

FIG. 4 is an illustration of an exemplary system 400 having a level of geographic redundancy in accordance with aspects of the subject disclosure. System 400 can include a set of radios, the set including radios 410, 420, 430, and 440. The set of radios can comprise part of a wireless network. Timing signals associated with radio links between the radios of the set and UEs can facilitate determination of location information, e.g., a NELOS or TFL-enabled wireless network. The distance between radio 410 and radio 420 can be distance 460. Similarly, the distance between radio 410 and radio 430 can be distance 450. Likewise, the distance between radio 420 and radio 430 can be distance 470.

In an aspect, UEs can employ radio pairs, such as the pair 410/420 and the pair 410/430, for determination of location information, such as by way of TFL techniques. However, use of radio pairs 410/420 and 410/430 can result in a degree of error where radios 420 and 430 can have a level of geometric redundancy. As an example, where radio 420 and radio 430 are close geometrically with respect to radio 410, the resulting TFL lookups in a TFL-enabled system, can return similar sets of bins that can result in an inaccurate union between the returned sets of bins and a widening effect on the probable location of a UE. By predetermining that radio 420 and radio 430 have a level of geometric redundancy with regard to radio 410, the selection of radio pairs for TFL lookup using both of the redundant radios can be deprioritized, for example, in favor of using just one of the geometrically redundant radios.

In an exemplary embodiment, the level of geometric redundancy can be binary. The exemplary embodiment can further be based on distance 450 and 460 being within, for example, 10% of each other. Then, where distances 450 and 460 are within 10% of each other, the distance 470 can be further evaluated to determine redundancy. As an example, where distance 470 is less than 10% of the average of distances 450 and 460, then radios 420 and 430 can be determined to be geometrically redundant with regard to radio 410.

In another exemplary embodiment, the same exemplary threshold values and rules can be employed and be applied with regard to radios 440, 420, and 430. As such, where distances 490 and 480 are within 10% of each other, then distance 470 can be evaluated to determine geometric redundancy. Thus, where distance 470 is less than 10% of the average of distances 480 and 490, radios 420 and 430 can be geometrically redundant with regard to radio 440. As can be observed, where radio 410 is much further away from radios 420 and 430 than radio 440, for the exemplary criteria, radios 420 and 430 are more likely to be geometrically redundant with regard to radio 410 than for radio 440.

The level of geometric redundancy information can be stored for the several radios, e.g., by way of radio information store, 212 or 312, etc. This predetermined geometric redundancy information can then facilitate selection of radio pairs that can be less affected by geometric redundancy when determining location information based on radio timing information.

It will be noted that the exemplary 10% value is arbitrarily selected to illustrate an example of the disclosed subject matter and that the disclosure is not so limited to that value or those near it. As further examples, the first determination of the difference between the long legs of the radio pair triangle, e.g., distances 460 and 450, etc., can be subject to any threshold value, such as, but not limited to, 1%, 10%, 50%, 90%, 100 meters, 2 chip, 5 msec, etc. Similarly, the determination of a level of geometric redundancy with regard to the short leg of the radio pair triangle, e.g., distance 470, etc., can be subject to any equation and/or threshold value, such as, but not limited to, distance 470 is greater than 1 meter but less than 100 meters; distance 470 is less than 2% of the sum of distances 460 and 450; distance 470 is less than 22% of the average of distances 490 and 480, etc.

Figure 5:
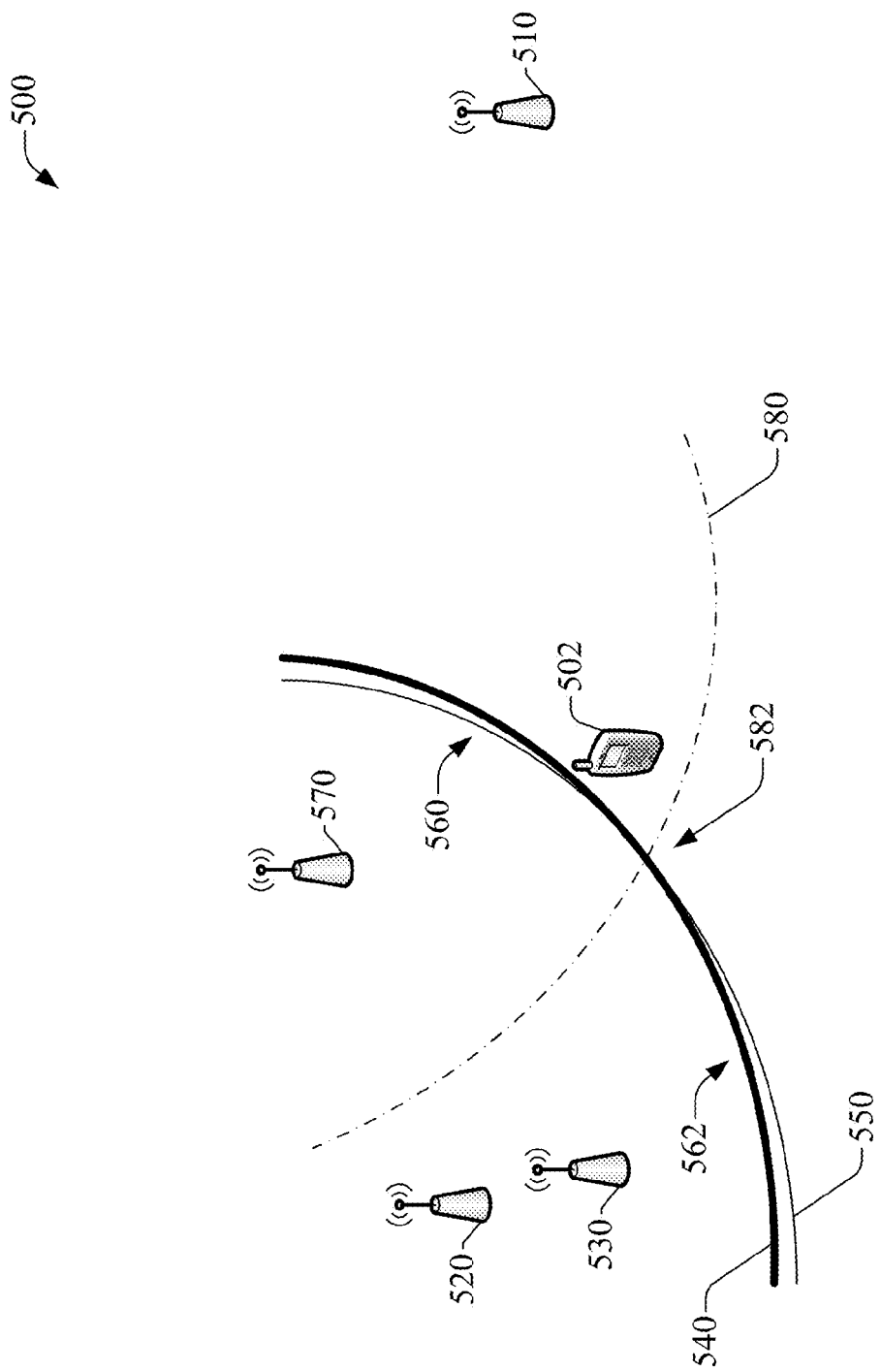
FIG. 5 is an illustration of an exemplary system having a level of geographic redundancy in accordance with aspects of the subject disclosure.

FIG. 5 is an illustration of an exemplary system 500 having a level of geographic redundancy in accordance with aspects of the subject disclosure. System 500 can include a set of radios, the set including radios 510, 520, 530, and 570. The set of radios can comprise part of a wireless network. Timing signals associated with radio links between the radios of the set and a UE 502 can facilitate determination of location information, e.g., a NELOS or TFL-enabled wireless network.

Determination of a level of geometric redundancy can occur as disclosed herein. This predetermined level of redundancy can be stored and received to facilitate selection of radio pairs for determination of location information. Determination of location information can be by way of TFL-enabled techniques, e.g., NELOS. As an example, radios 520 and 530 can be predetermined to be geometrically redundant with regard to radio 510 and not geometrically redundant with regard to radio 570. As such, selection of radio pairs for location determination can be considerate of the predetermined geometric redundancy.

Continuing the example, if radio pair 510/520 and radio pair 510/530 are selected for determining location information by way of a TFL technique, lookup of the timing values of the pairs can result in exemplary probable bin locations defined by curved lines 540 and 550 respectively. As will be noted in the illustration of system 500, bin locations for 540 and 550 are highly similar and a union of the two sets of bin locations could result in a probable location between area 560 and 562 along curves 540 or 550. This result can be less accurate, due to employing geometrically redundant radio pairs, than a TFL lookups with non-redundant radio pairs.

As an example of selecting non-redundant radio pairs, curved line 580 can represent the set of returned bin grid locations for an exemplary TFL lookup for radio pair 570/530. As such, for determining location information for UE 502, it can be determined that employing radio pair 510/520 in conjunction with radio pair 510/530 is lower priority because of a predetermined geometric redundancy. Therefore, either radio pair 510/520 or radio pair 510/530 can be employed with another non-redundant radio pair, such as radio pair 570/530. This can result in determining the probable location to be at the union of either curve 540 or 550 with curve 580. Given that the curves are much less similar, the union can be more distinct and can have less ambiguity as to the probable location of UE 502 at 582, rather than between 560 and 562 as discussed earlier in the example.

In a further aspect, treatment of radio pairs demonstrating a level of geometric redundancy can include exclusion of one of the redundant radio pairs as disclosed in the above example. Another treatment option can include exclusion of both pairs in favor of purely non-redundant radios. A further treatment can include 'averaging' the redundant radio pairs, e.g., an 'average' of radio 520 and radio 530 with regard to radio 510 can return an average of the curves 540 and 550. Yet another treatment can include selecting one or more of the redundant radios based on another criteria in light of the radios being redundant, for example, where the radios are redundant but have the most recent calibration they can still be selected over other non-redundant but poorly calibrated radios, though the selection techniques are beyond the scope of the present disclosure.

Figure 6:
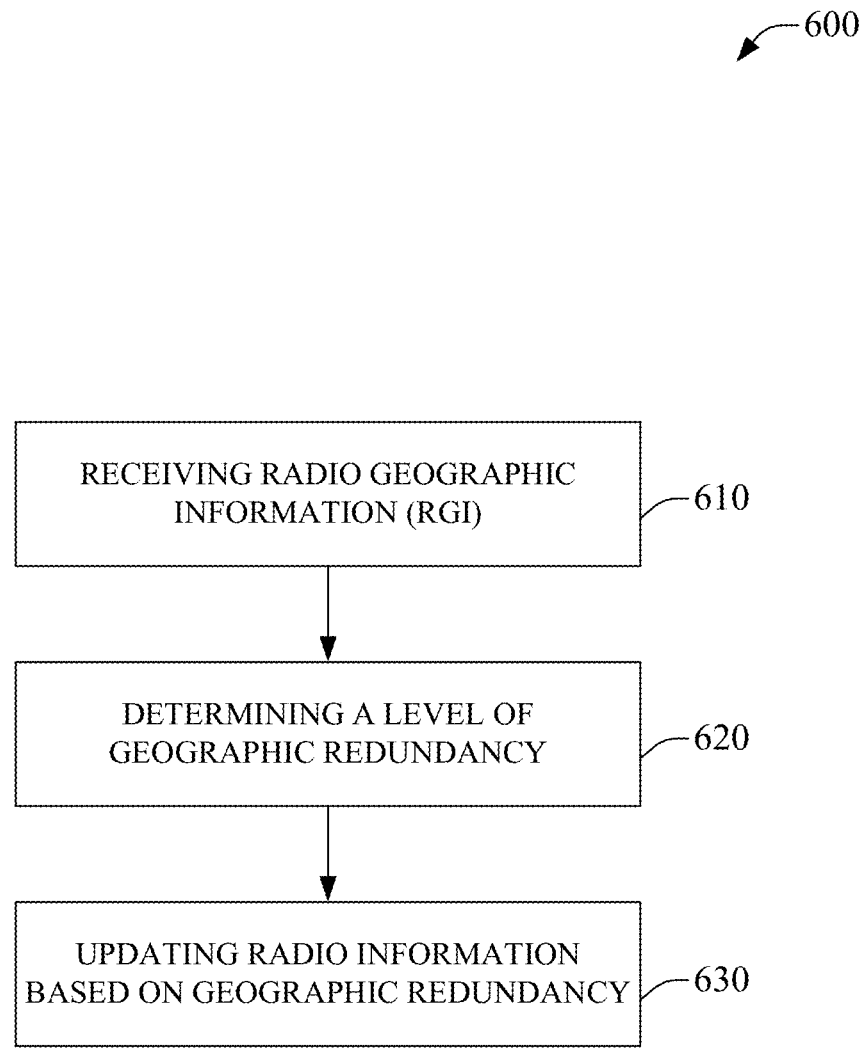
FIG. 6 illustrates a method facilitating determining a level of geographic redundancy in accordance with aspects of the subject disclosure.
Figure 7:
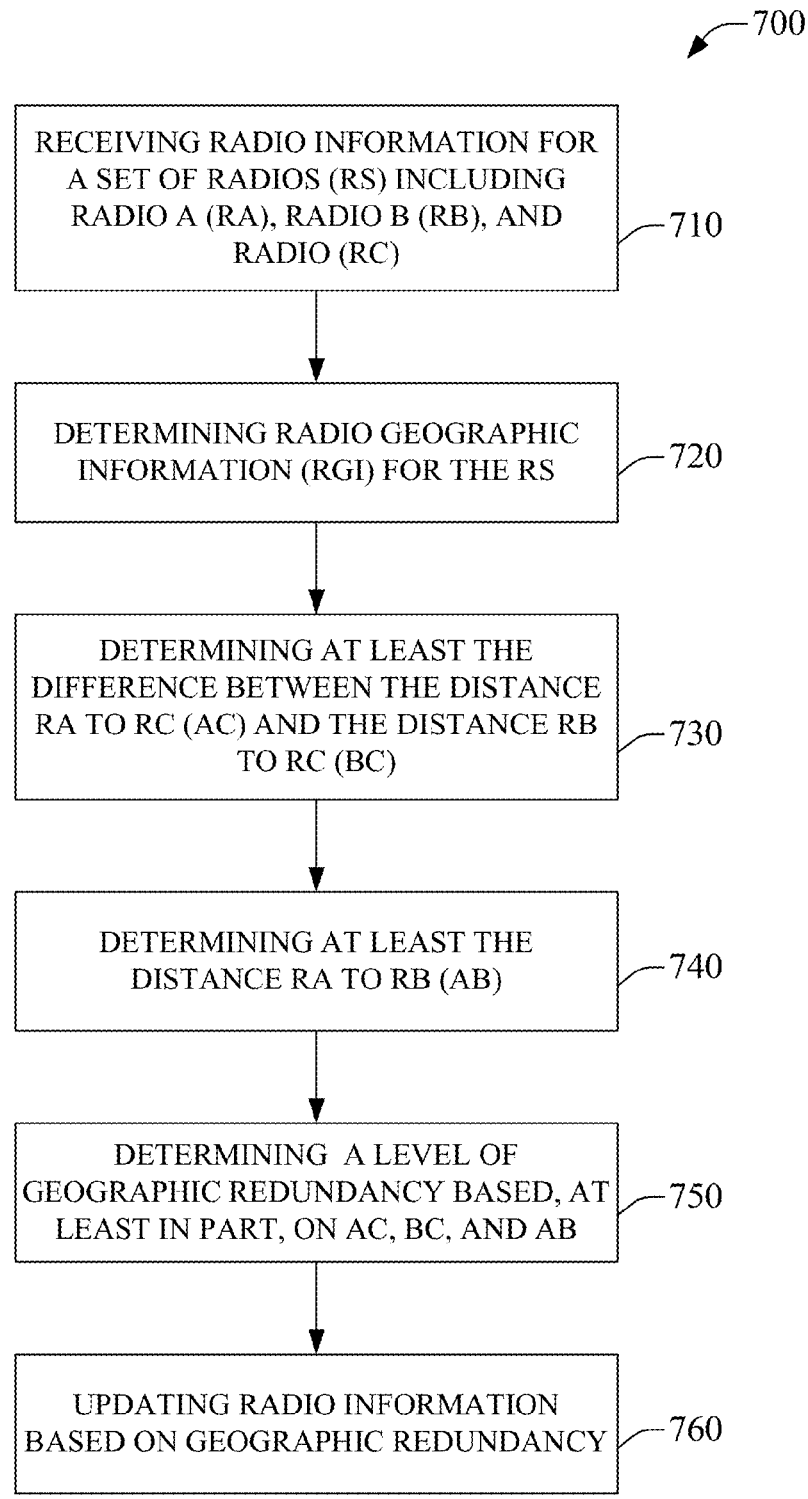
FIG. 7 illustrates a method for facilitating determining a level of geographic redundancy in accordance with aspects of the subject disclosure.
Figure 8:
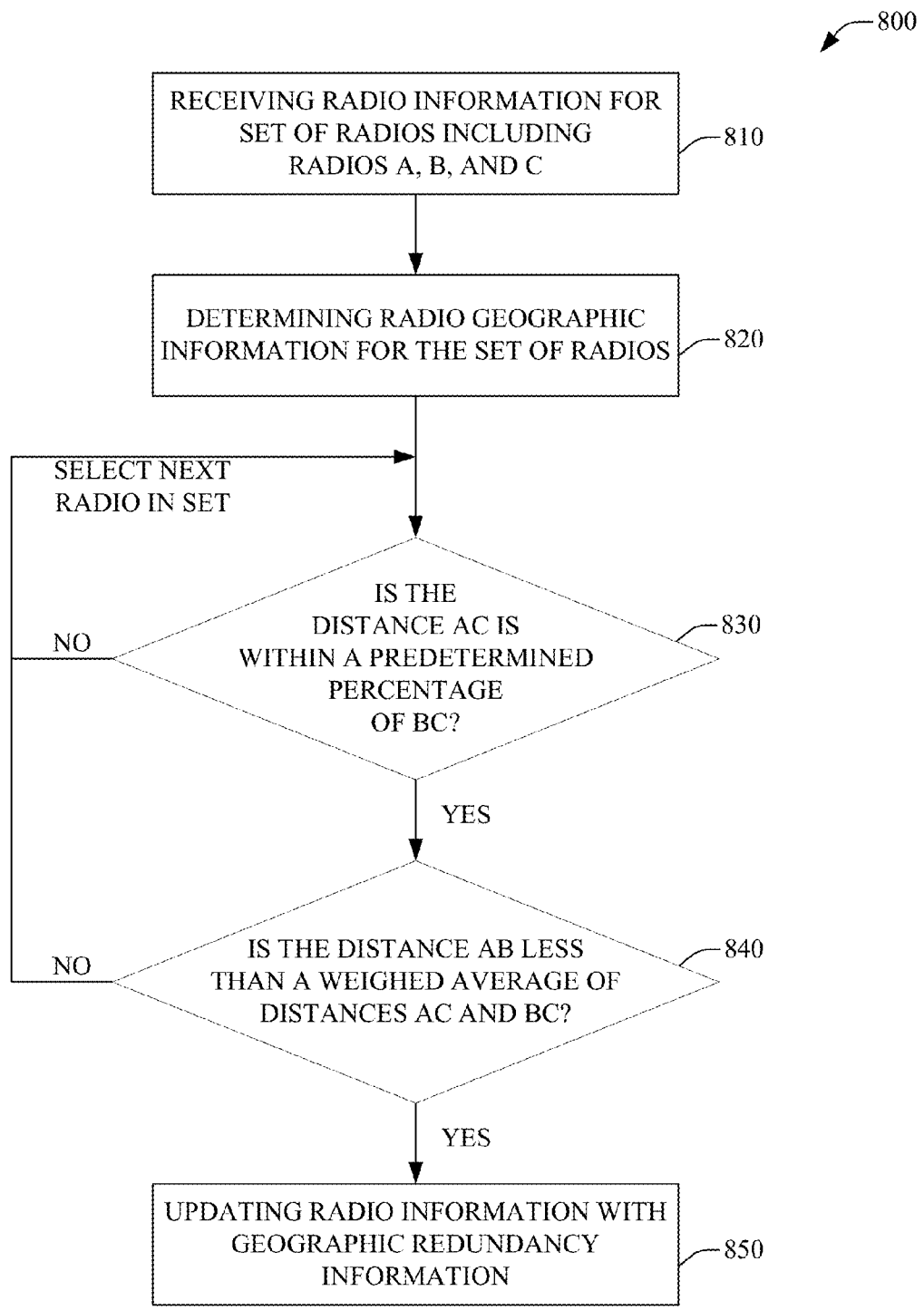
FIG. 8 illustrates an exemplary flowchart for a method facilitating determining a level of geographic redundancy in accordance with aspects of the subject disclosure.

In view of the example system(s) described above, example method(s) that can be implemented in accordance with the disclosed subject matter can be better appreciated with reference to flowcharts in FIG. 6-FIG. 8. For purposes of simplicity of explanation, example methods disclosed herein are presented and described as a series of acts; however, it is to be understood and appreciated that the claimed subject matter is not limited by the order of acts, as some acts may occur in different orders and/or concurrently with other acts from that shown and described herein. For example, one or more example methods disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a described example method in accordance with the subject specification. Further yet, two or more of the disclosed example methods can be implemented in combination with each other, to accomplish one or more aspects herein described. It should be further appreciated that the example methods disclosed throughout the subject specification are capable of being stored on an article of manufacture (e.g., a computer-readable medium) to allow transporting and transferring such methods to computers for execution, and thus implementation, by a processor or for storage in a memory.

FIG. 6 illustrates aspects of a method 600 facilitating determining a level of geographic redundancy in accordance with aspects of the subject disclosure. At 610, radio geographic information (RGI) can be received. RGI can be related to radios of a wireless network. Whereas wireless network carriers know the location at which radios of a wireless network are placed as part of deploying the physical resources of a wireless network, RGI can include the geographic information of radios in the wireless network. In certain embodiments, geographic information for wireless network radios can be in the form of geographic information system (GIS) information. A geographic information system can be a system designed to handle types of geographical data.

At 620, a level of geographic redundancy can be determined based on the RGI received at 610. The determination of the level of geographic redundancy can be based on a rule. In an aspect, rules can relate to definition of, or characterization of geographic information as it relates to geographic redundancy. As an example, a rule can include a predetermined threshold value that corresponds to different levels of redundancy. In a further aspect, rules can relate to boundary conditions related to determinations of geographic redundancy. As an example, in large sets of radios, a boundary condition can limit determining redundancy to radios within a predetermined distance, selected region, selected status, etc.

A level of geographic redundancy can be binary or can relate to a plurality of levels of redundancy. Additionally, a level of geographic redundancy can be employed to rank or order radios, or as a factor in other ranking or ordering techniques, etc. In a further aspect, levels of geometric redundancy can be determined for some, all, or no radios in a set of radios associated with received RGI. In an aspect, the selection of a subset of radios from a set of radios for which RGI is available can be a form of bounding. Bounding can allow, for example, predetermination of a level of geometric redundancy for radios within a predetermined distance from each other, etc. This can significantly reduce the number of determinations that are made in large sets of radios, e.g., determinations of radio sets for regions of a wireless network, etc.

At 630, radio information can be updated based on the determined level of geographic redundancy. At this point, method 600 can end. A determined level of geographic redundancy can be employed to update radio information. This can facilitate selection of radios that meet predetermined ranking criteria associated with a predetermined level of geographic redundancy. As an example, a UE can be associated with a set of radio pairs facilitating a TFL information determination, the set including at least a pair of radios with a predetermined level of geometrically redundancy. In light of the predetermined level of redundancy, the exemplary TFL information determination can be based on radio pairs of the set of radios with lower levels of geometric redundancy to increase an overall level of confidence in the determined location information.

FIG. 7 illustrates a method 700 that facilitates determining a level of geographic redundancy in accordance with aspects of the subject disclosure. At 710, radio information can be received. Radio information can be for a set of radios (RS) including a first radio (RA) a second radio (RB) and a third radio (RC) of a wireless network. At 720, RGI can be determined from the radio information received at 710. RGI can be related to radios of a wireless network. RGI can include the geographic information of radios in the wireless network.

At 730, the difference between the distance from the first to the third radio and the distance from the second to the third radio can be determined, e.g., the difference between RA to RC (AC) and RB to RC (BC). In an aspect, this can be written in equation form as |AC−BC|. At 740, a distance between the first and second radio can be determined, e.g., the distance RA to RB (AB).

At 750, a level of geographic redundancy can be determined based on the distances determined at 730 and 740, e.g., AC, BC, and AB, etc. The determination of the level of geographic redundancy can be based on a rule. In an aspect, rules can relate to definition of, or characterization of geographic information as it relates to geographic redundancy. As an example, a rule can include a predetermined threshold value that corresponds to different levels of redundancy. In a further aspect, rules can relate to boundary conditions related to determinations of geographic redundancy. As an example, in large sets of radios, a boundary condition can limit determining redundancy to radios within a predetermined distance, selected region, selected status, etc.

A level of geographic redundancy can be binary or can relate to a plurality of levels of redundancy. Additionally, a level of geographic redundancy can be employed to rank or order radios, or as a factor in other ranking or ordering techniques, etc. In a further aspect, levels of geometric redundancy can be determined for some, all, or no radios in a set of radios associated with received RGI. In an aspect, the selection of a subset of radios from a set of radios for which RGI is available can be a form of bounding. Bounding can allow, for example, predetermination of a level of geometric redundancy for radios within a predetermined distance from each other, etc. This can significantly reduce the number of determinations that are made in large sets of radios, e.g., determinations of radio sets for regions of a wireless network, etc.

In an embodiment, the determination of a level of geographic redundancy can be based on a two-part determination. The first part of the determination can be based on the distance difference determined at 730. As a non-limiting example, a rule for the first part of the determination can be that to proceed to the second part of the determination the difference between the distance from the first to the third radio and the distance from the second to the third radio must be within 10%. The first part of the exemplary determination, in equation form, can be $$\begin{cases} |AC-BC| \leq 0.1(AC) \\ |AC-BC| \leq 0.1(BC) \end{cases}.$$

The second part of the determination for the particular embodiment can be based on a comparison of the distance between the first and second radios and the determined distance from the first part of the determination. As a non-limiting example of the second part of the determination, inclusive of the results of the first part of the determination, in equation form, can be that geometric redundancy is present if, $[2(AB)/((AC)+(BC))] \leq 0.1$. It will be noted that the exemplary threshold values and exemplary equations are merely for illustration and are non-limiting. It will further be noted that other equations and threshold values can be employed without departing from the scope of the present subject matter. Moreover, the particular example of a two-part determination is non-limiting and other examples are not presented simply for clarity and brevity, though all such other techniques for determining a level of geographic redundancy are to be considered within the scope of the presently disclosed subject matter.

At 760, radio information can be updated based on the determined level of geographic redundancy. At this point, method 700 can end. A determined level of geographic redundancy can be employed to update radio information. This can facilitate selection of radios that meet predetermined ranking criteria associated with a predetermined level of geographic redundancy. As an example, a UE can be associated with a set of radio pairs facilitating a TFL information determination, the set including at least a pair of radios with a predetermined level of geometrically redundancy. In light of the predetermined level of redundancy, the exemplary TFL information determination can be based on radio pairs of the set of radios with lower levels of geometric redundancy to increase an overall level of confidence in the determined location information.

FIG. 8 illustrates a method 800 that facilitates determining a level of geographic redundancy in accordance with aspects of the subject disclosure. At 810, radio information can be received. Radio information can be for a set of radios (RS) including a first radio (RA) a second radio (RB) and a third radio (RC) of a wireless network. At 820, RGI can be determined from the radio information received at 810. RGI can be related to radios of a wireless network, e.g., RS. RGI can include the geographic information of radios in the wireless network.

At 830, it can be determined if the difference between the distance from the first to the third radio and the distance from the second to the third radio is within a predetermined range of values, e.g., the difference between distance AC can be less than a predetermined percentage of the distance BC. If the determination at 830 is affirmative, at 840, it can be determined if a distance between the first and second radio, e.g., distance AB, is less than a weighted average of the distance from the first to the third radio and the distance from the second to the third radio, e.g., $$AB < \frac{(AC+BC)}{20}.$$

Where 840 is determined in the affirmative, a level of geographic redundancy is indicated and method 800 proceeds to 850.

At 850, radio information can be updated based on the determined level of geographic redundancy. At this point, method 800 can end. A determined level of geographic redundancy can be employed to update radio information. This can facilitate selection of radios that meet predetermined ranking criteria associated with a predetermined level of geographic redundancy.

It will be noted that the exemplary threshold values and exemplary equations are merely for illustration and are non-limiting. It will further be noted that other equations and threshold values can be employed without departing from the scope of the present subject matter.

Figure 9:
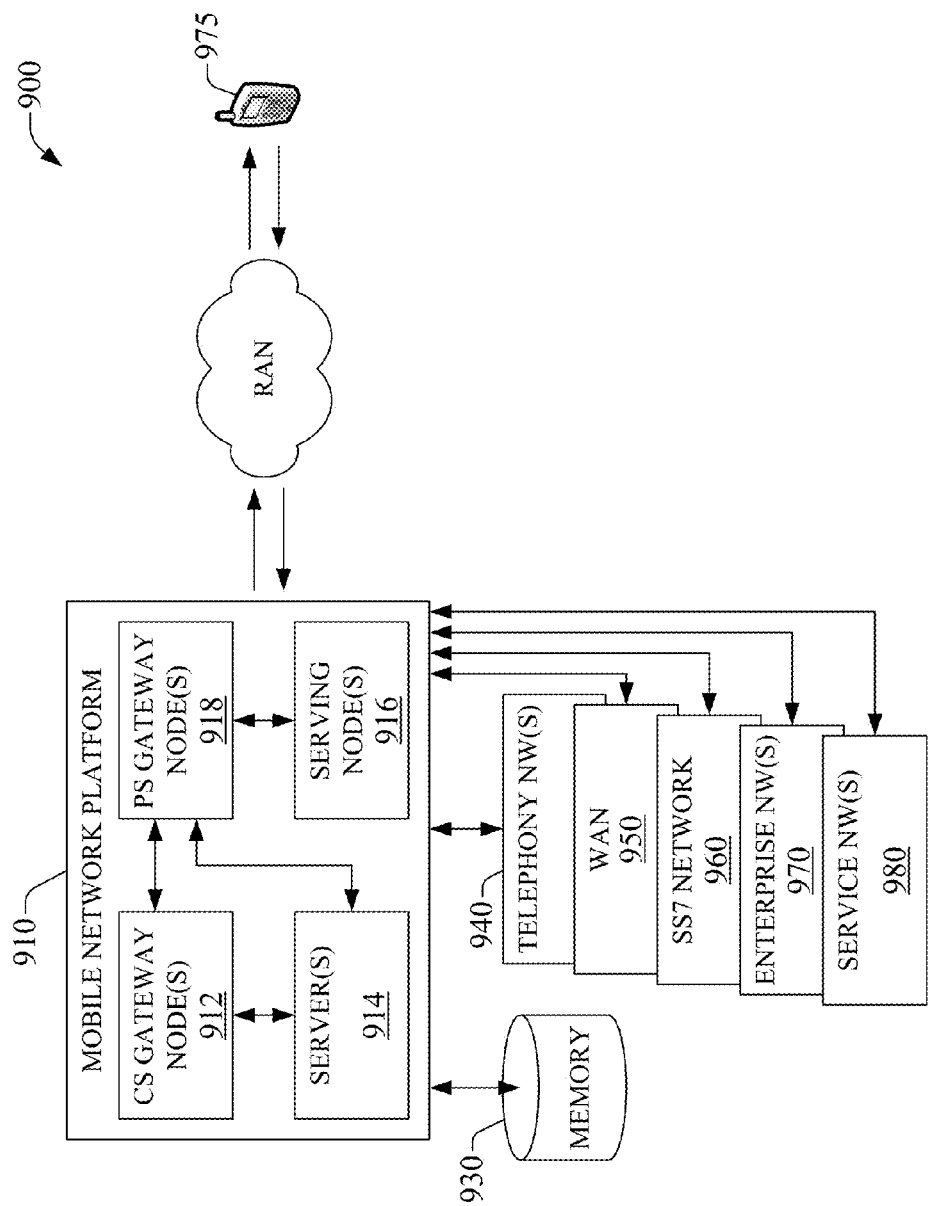
FIG. 9 is a block diagram of an exemplary embodiment of a mobile network platform to implement and exploit various features or aspects of the subject disclosure.

FIG. 9 presents an example embodiment 900 of a mobile network platform 910 that can implement and exploit one or more aspects of the disclosed subject matter described herein. Generally, wireless network platform 910 can include components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, wireless network platform 910 can be included in telecommunications carrier networks, and can be considered carrier-side components as discussed elsewhere herein. Mobile network platform 910 includes CS gateway node(s) 912 which can interface CS traffic received from legacy networks like telephony network(s) 940 (e.g., public switched telephone network (PSTN), or public land mobile network (PLMN)) or a signaling system #7 (SS7) network 970. Circuit switched gateway node(s) 912 can authorize and authenticate traffic (e.g., voice) arising from such networks. Additionally, CS gateway node(s) 912 can access mobility, or roaming, data generated through SS7 network 970; for instance, mobility data stored in a visited location register (VLR), which can reside in memory 930. Moreover, CS gateway node(s) 912 interfaces CS-based traffic and signaling and PS gateway node(s) 918. As an example, in a 3GPP UMTS network, CS gateway node(s) 912 can be realized at least in part in gateway GPRS support node(s) (GGSN). It should be appreciated that functionality and specific operation of CS gateway node(s) 912, PS gateway node(s) 918, and serving node(s) 916, is provided and dictated by radio technology(ies) utilized by mobile network platform 910 for telecommunication.

In addition to receiving and processing CS-switched traffic and signaling, PS gateway node(s) 918 can authorize and authenticate PS-based data sessions with served mobile devices. Data sessions can include traffic, or content(s), exchanged with networks external to the wireless network platform 910, like wide area network(s) (WANs) 950, enterprise network(s) 970, and service network(s) 980, which can be embodied in local area network(s) (LANs), can also be interfaced with mobile network platform 910 through PS gateway node(s) 918. It is to be noted that WANs 950 and enterprise network(s) 960 can embody, at least in part, a service network(s) like IP multimedia subsystem (IMS). Based on radio technology layer(s) available in technology resource(s) 917, packet-switched gateway node(s) 918 can generate packet data protocol contexts when a data session is established; other data structures that facilitate routing of packetized data also can be generated. To that end, in an aspect, PS gateway node(s) 918 can include a tunnel interface (e.g., tunnel termination gateway (TTG) in 3GPP UMTS network(s) (not shown)) which can facilitate packetized communication with disparate wireless network(s), such as Wi-Fi networks.

In embodiment 900, wireless network platform 910 also includes serving node(s) 916 that, based upon available radio technology layer(s) within technology resource(s) 917, convey the various packetized flows of data streams received through PS gateway node(s) 918. It is to be noted that for technology resource(s) 917 that rely primarily on CS communication, server node(s) can deliver traffic without reliance on PS gateway node(s) 918; for example, server node(s) can embody at least in part a mobile switching center. As an example, in a 3GPP UMTS network, serving node(s) 916 can be embodied in serving GPRS support node(s) (SGSN).

For radio technologies that exploit packetized communication, server(s) 914 in wireless network platform 910 can execute numerous applications that can generate multiple disparate packetized data streams or flows, and manage (e.g., schedule, queue, format . . . ) such flows. Such application(s) can include add-on features to standard services (for example, provisioning, billing, customer support . . . ) provided by wireless network platform 910. Data streams (e.g., content(s) that are part of a voice call or data session) can be conveyed to PS gateway node(s) 918 for authorization/authentication and initiation of a data session, and to serving node(s) 916 for communication thereafter. In addition to application server, server(s) 914 can include utility server(s), a utility server can include a provisioning server, an operations and maintenance server, a security server that can implement at least in part a certificate authority and firewalls as well as other security mechanisms, and the like. In an aspect, security server(s) secure communication served through wireless network platform 910 to ensure network's operation and data integrity in addition to authorization and authentication procedures that CS gateway node(s) 912 and PS gateway node(s) 918 can enact. Moreover, provisioning server(s) can provision services from external network(s) like networks operated by a disparate service provider; for instance, WAN 950 or Global Positioning System (GPS) network(s) (not shown). Provisioning server(s) can also provision coverage through networks associated to wireless network platform 910 (e.g., deployed and operated by the same service provider), such as femto-cell network(s) (not shown) that enhance wireless service coverage within indoor confined spaces and offload RAN resources in order to enhance subscriber service experience within a home or business environment by way of UE 975.

It is to be noted that server(s) 914 can include one or more processors configured to confer at least in part the functionality of macro network platform 910. To that end, the one or more processor can execute code instructions stored in memory 930, for example. It is should be appreciated that server(s) 914 can include a content manager 915, which operates in substantially the same manner as described hereinbefore.

In example embodiment 900, memory 930 can store information related to operation of wireless network platform 910. Other operational information can include provisioning information of mobile devices served through wireless platform network 910, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 930 can also store information from at least one of telephony network(s) 940, WAN 950, enterprise network(s) 960, or SS7 network 970. In an aspect, memory 930 can be, for example, accessed as part of a data store component or as a remotely connected memory store.

Figure 10:
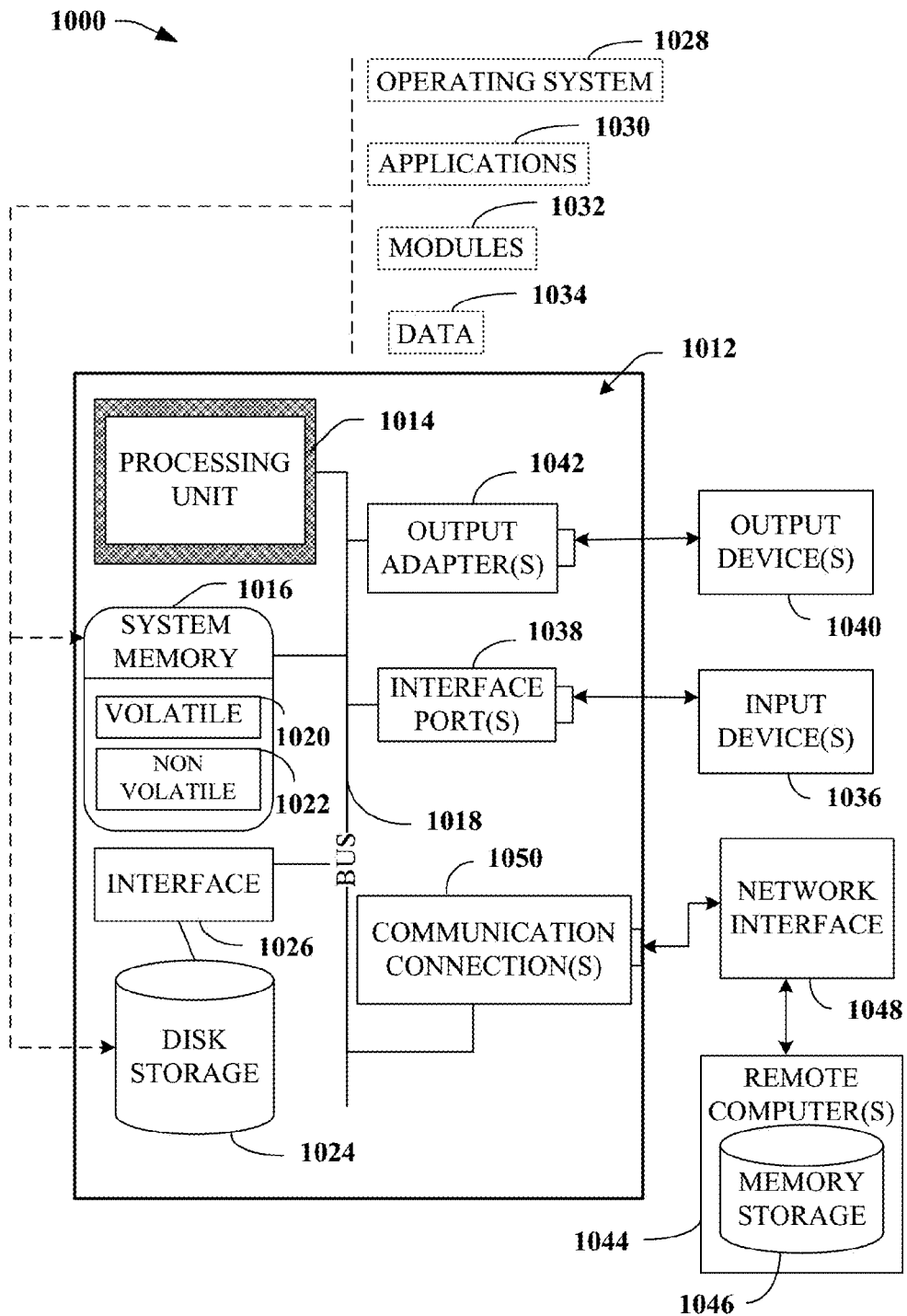
FIG. 10 illustrates a block diagram of a computing system operable to execute the disclosed systems and methods in accordance with an embodiment.

In order to provide a context for the various aspects of the disclosed subject matter, FIG. 10, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules include routines, programs, components, data structures, etc., that perform particular tasks and/or implement particular abstract data types.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory, by way of illustration, and not limitation, volatile memory 1020 (see below), non-volatile memory 1022 (see below), disk storage 1024 (see below), and memory storage 1046 (see below). Further, nonvolatile memory can be included in read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, including single-processor or multiprocessor computer systems, mini-computing devices, mainframe computers, as well as personal computers, hand-held computing devices (e.g., PDA, phone, watch, tablet computers, netbook computers, . . . ), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

FIG. 10 illustrates a block diagram of a computing system 1000 operable to execute the disclosed systems and methods in accordance with an embodiment. Computer 1012, which can be, for example, part of the hardware of a geographical redundancy component e.g., component 130, 23, 330, etc., TFL component, e.g., 340, etc., a user equipment, e.g., UE 502, etc., includes a processing unit 1014, a system memory 1016, and a system bus 1018. System bus 1018 couples system components including, but not limited to, system memory 1016 to processing unit 1014. Processing unit 1014 can be any of various available processors. Dual microprocessors and other multiprocessor architectures also can be employed as processing unit 1014.

System bus 1018 can be any of several types of bus structure(s) including a memory bus or a memory controller, a peripheral bus or an external bus, and/or a local bus using any variety of available bus architectures including, but not limited to, Industrial Standard Architecture (ISA), Micro-Channel Architecture (MSA), Extended ISA (EISA), Intelligent Drive Electronics, VESA Local Bus (VLB), Peripheral Component Interconnect (PCI), Card Bus, Universal Serial Bus (USB), Advanced Graphics Port (AGP), Personal Computer Memory Card International Association bus (PC-MCIA), Firewire (IEEE 1194), and Small Computer Systems Interface (SCSI).

System memory 1016 can include volatile memory 1020 and nonvolatile memory 1022. A basic input/output system (BIOS), containing routines to transfer information between elements within computer 1012, such as during start-up, can be stored in nonvolatile memory 1022. By way of illustration, and not limitation, nonvolatile memory 1022 can include ROM, PROM, EPROM, EEPROM, or flash memory. Volatile memory 1020 includes RAM, which acts as external cache memory. By way of illustration and not limitation, RAM is available in many forms such as SRAM, dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1012 can also include removable/non-removable, volatile/non-volatile computer storage media. FIG. 10 illustrates, for example, disk storage 1024. Disk storage 1024 includes, but is not limited to, devices like a magnetic disk drive, floppy disk drive, tape drive, flash memory card, or memory stick. In addition, disk storage 1024 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1024 to system bus 1018, a removable or non-removable interface is typically used, such as interface 1026.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

It can be noted that FIG. 10 describes software that acts as an intermediary between users and computer resources described in suitable operating environment 1000. Such software includes an operating system 1028. Operating system 1028, which can be stored on disk storage 1024, acts to control and allocate resources of computer system 1012. System applications 1030 take advantage of the management of resources by operating system 1028 through program modules 1032 and program data 1034 stored either in system memory 1016 or on disk storage 1024. It is to be noted that the disclosed subject matter can be implemented with various operating systems or combinations of operating systems.

A user can enter commands or information into computer 1012 through input device(s) 1036. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, cell phone, smartphone, tablet computer, etc. These and other input devices connect to processing unit 1014 through system bus 1018 by way of interface port(s) 1038. Interface port(s) 1038 include, for example, a serial port, a parallel port, a game port, a universal serial bus (USB), an infrared port, a Bluetooth port, an IP port, or a logical port associated with a wireless service, etc. Output device(s) 1040 use some of the same type of ports as input device(s) 1036.

Thus, for example, a USB port can be used to provide input to computer 1012 and to output information from computer 1012 to an output device 1040. Output adapter 1042 is provided to illustrate that there are some output devices 1040 like monitors, speakers, and printers, among other output devices 1040, which use special adapters. Output adapters 1042 include, by way of illustration and not limitation, video and sound cards that provide means of connection between output device 1040 and system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. Remote computer(s) 1044 can be a personal computer, a server, a router, a network PC, cloud storage, cloud service, a workstation, a microprocessor based appliance, a peer device, or other common network node and the like, and typically includes many or all of the elements described relative to computer 1012.

For purposes of brevity, only a memory storage device 1046 is illustrated with remote computer(s) 1044. Remote computer(s) 1044 is logically connected to computer 1012 through a network interface 1048 and then physically connected by way of communication connection 1050. Network interface 1048 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit-switching networks like Integrated Services Digital Networks (ISDN) and variations thereon, packet switching networks, and Digital Subscriber Lines (DSL). As noted below, wireless technologies may be used in addition to or in place of the foregoing.

Communication connection(s) 1050 refer(s) to hardware/software employed to connect network interface 1048 to bus 1018. While communication connection 1050 is shown for illustrative clarity inside computer 1012, it can also be external to computer 1012. The hardware/software for connection to network interface 1048 can include, for example, internal and external technologies such as modems, including regular telephone grade modems, cable modems and DSL modems, ISDN adapters, and Ethernet cards.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Moreover, terms like "user equipment (UE)," "mobile station," "mobile," subscriber station," "subscriber equipment," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "radio," "access point (AP)," "base station," "Node B," "evolved Node B (eNode B)," "home Node B (HNB)," "home access point (HAP)," and the like, are utilized interchangeably in the subject application, and refer to a wireless network component or appliance that serves and receives data, control, voice, video, sound, gaming, or substantially any data-stream or signaling-stream to and from a set of subscriber stations or provider enabled devices. Data and signaling streams can include packetized or frame-based flows.

Additionally, the terms "core-network," "core," "core carrier network," "carrier-side," "carrier network," or similar terms can refer to components of a telecommunications network that typically provides some or all of aggregation, authentication, call control and switching, charging, service invocation, or gateways. Aggregation can refer to the highest level of aggregation in a service provider network wherein the next level in the hierarchy under the core nodes is the distribution networks and then the edge networks. UEs do not normally connect directly to the core networks of a large service provider but can be routed to the core by way of a switch or radio area network. Authentication can refer to determinations regarding whether the user requesting a service from the telecom network is authorized to do so within this network or not. Call control and switching can refer determinations related to the future course of a call stream across carrier equipment based on the call signal processing. Charging can be related to the collation and processing of charging data generated by various network nodes. Two common types of charging mechanisms found in present day networks can be prepaid charging and postpaid charging. Service invocation can occur based on some explicit action (e.g. call transfer) or implicitly (e.g., call waiting). It is to be noted that service "execution" may or may not be a core network functionality as third party network/nodes may take part in actual service execution. A gateway can be present in the core network to access other networks. Gateway functionality can be dependent on the type of the interface with another network.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks include Geocast technology; broadcast technologies (e.g., sub-Hz, ELF, VLF, LF, MF, HF, VHF, UHF, SHF, THz broadcasts, etc.); Ethernet; X.25; powerline-type networking (e.g., PowerLine AV Ethernet, etc.); femto-cell technology; Wi-Fi; Worldwide Interoperability for Microwave Access (WiMAX); Enhanced General Packet Radio Service (Enhanced GPRS); Third Generation Partnership Project (3GPP or 3G) Long Term Evolution (LTE); 3GPP Universal Mobile Telecommunications System (UMTS) or 3GPP UMTS; Third Generation Partnership Project 2 (3GPP2) Ultra Mobile Broadband (UMB); High Speed Packet Access (HSPA); High Speed Downlink Packet Access (HSDPA); High Speed Uplink Packet Access (HSUPA); GSM Enhanced Data Rates for GSM Evolution (EDGE) Radio Access Network (RAN) or GERAN; UMTS Terrestrial Radio Access Network (UTRAN); or LTE Advanced.

What has been described above includes examples of systems and methods illustrative of the disclosed subject matter. It is, of course, not possible to describe every combination of components or methods herein. One of ordinary skill in the art may recognize that many further combinations and permutations of the claimed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A system, comprising:
   a processor; and
   a memory that stores executable instructions that, when executed by the processor, facilitate performance of operations, comprising:
   in response to receiving an indication of a change in geographic information relating to a first radio of a wireless network, updating a level of geographic redundancy associated with the first radio and a second radio of the wireless network;
   determining a rank value of the first radio based on the level of geographic redundancy; and
   in response to the rank value being determined to have satisfied a selection rule, updating first timed fingerprint location information corresponding to the first radio.

2. The system of claim 1, wherein the updating the level of geographic redundancy comprises determining an error in location accuracy associated with a location change for the first radio corresponding to the change in the geographic information relating to the first radio.

3. The system of claim 2, wherein the location change results from the first radio having been physically moved from a first location to a second location different from the first location.

4. The system of claim 2, wherein the location change results from the first radio having been newly added to the wireless network at a first location.

5. The system of claim 1, wherein the determining the rank value comprises updating a previous rank value of the first radio.

6. The system of claim 5, wherein the updating the previous rank value of the first radio results in increasing the rank value over the previous rank value.

7. The system of claim 5, wherein the updating the previous rank value of the first radio results in decreasing the rank value from the previous rank value.

8. The system of claim 5, wherein the updating the previous rank value of the first radio results in the rank value remaining unchanged from the previous rank value.

9. A method, comprising:
   determining, by a system comprising a processor, a change in geographic information for a first radio corresponding to a change in a location of the first radio;
   updating, by the system, a level of geographic redundancy for the first radio, in relation to a second radio, based on first geographic information of the first radio and second geographic information of the second radio, wherein the first geographic information corresponds to the change in the geographic information for the first radio;
   updating, by the system, a rank of the first radio in response to the updating the level of geographic redundancy; and
   updating, by the system, first timed fingerprint location information corresponding to the first radio in response to the rank having been determined to satisfy a selection rule.

10. The method of claim 9, wherein the change in the location of the first radio results from the first radio being physically relocated from a first location to a second location.

11. The method of claim 9, wherein the change in the location of the first radio results from a first physical location of the first radio determined via a first location technology being different from a second physical location of the first radio determined via a second location technology.

12. The method of claim 9, wherein the change in the location of the first radio results from the first radio being newly added at a first location.

13. The method of claim 9, wherein the updating the rank of the first radio results in the rank of the first radio being increased relative to a previous rank of the first radio.

14. The method of claim 9, wherein the updating the rank of the first radio results in the rank of the first radio being decreased relative to a previous rank of the first radio.

15. The method of claim 9, wherein the updating the rank of the first radio results in the rank of the first radio remaining unchanged relative to a previous rank of the first radio.

16. A non-transitory machine-readable storage medium, comprising executable instructions that, when executed by a processor, facilitate performance of operations, comprising:
   in response to detecting a change in a location of a first radio from a first location to a second location, updating a level of geographic redundancy for the first radio in relation to a second radio based on first geographic information of the first radio and second geographic information of the second radio, wherein the first geographic information corresponded to the second location of the first radio;
   in response to updating the level of geographic redundancy, determining a rank value of the first radio based on the level of geographic redundancy; and
   enabling access to first timed fingerprint location information corresponding to the first radio, wherein the first timed fingerprint location information is updated in response to the rank value being determined to have satisfied a selection rule.

17. The non-transitory machine-readable storage medium of claim 16, wherein the first radio is physically relocated from the first location to the second location.

18. The non-transitory machine-readable storage medium of claim 16, wherein the first location is different from the second location as a result of employing a first location technology to determine the first location, and a second location technology to determine the second location, and wherein the first location technology and the second location technology are different location technologies.

19. The non-transitory machine-readable storage medium of claim 16, wherein the rank value is different from a previous rank value of the first radio.

20. The non-transitory machine-readable storage medium of claim 16, wherein the rank value is a same rank as a previous rank value of the first radio.

* * * * *